United States Patent
Yamamoto et al.

(10) Patent No.: US 7,600,218 B2
(45) Date of Patent: Oct. 6, 2009

(54) ASSOCIATION CONTROL APPARATUS, ASSOCIATION CONTROL METHOD AND SERVICE ASSOCIATION SYSTEM

(75) Inventors: Kakuya Yamamoto, Ashiya (JP); Takahiro Yamaguchi, Ashiya (JP); Satoru Matsunaga, Moriguchi (JP); Akira Ishikawa, Kashiba (JP)

(73) Assignee: Panasonic Corporation, Osaka (JP)

( * ) Notice: Subject to any disclaimer, the term of this patent is extended or adjusted under 35 U.S.C. 154(b) by 622 days.

(21) Appl. No.: 10/546,917

(22) PCT Filed: Nov. 19, 2004

(86) PCT No.: PCT/JP2004/017631

§ 371 (c)(1),
(2), (4) Date: Aug. 25, 2005

(87) PCT Pub. No.: WO2005/050921

PCT Pub. Date: Jun. 2, 2005

(65) Prior Publication Data
US 2006/0150142 A1  Jul. 6, 2006

(30) Foreign Application Priority Data
Nov. 20, 2003  (JP) ............................. 2003-390521

(51) Int. Cl.
*G06F 9/44* (2006.01)
*G06F 3/00* (2006.01)

(52) U.S. Cl. .................... 717/121; 717/106; 717/107; 717/168; 710/8

(58) Field of Classification Search ......... 717/120–121, 717/106–107, 171–173, 168; 455/151.1–151.2; 710/8–14
See application file for complete search history.

(56) References Cited

U.S. PATENT DOCUMENTS

| | | | |
|---|---|---|---|
| 5,838,918 A * | 11/1998 | Prager et al. | 709/221 |
| 6,906,617 B1 * | 6/2005 | Van der Meulen | 340/538 |
| 6,980,079 B1 * | 12/2005 | Shintani et al. | 340/3.1 |
| 6,993,398 B2 * | 1/2006 | Li et al. | 700/90 |
| 7,206,559 B2 * | 4/2007 | Meade, II | 455/151.1 |
| 2001/0030664 A1 * | 10/2001 | Shulman et al. | 345/835 |
| 2003/0081745 A1 * | 5/2003 | Ito et al. | 379/102.03 |
| 2003/0100336 A1 * | 5/2003 | Cronin | 455/556 |
| 2003/0177159 A1 | 9/2003 | Li et al. | |

FOREIGN PATENT DOCUMENTS

| | | |
|---|---|---|
| CN | 1319318 | 10/2001 |
| CN | 1437328 | 8/2003 |
| EP | 1 115 263 | 7/2001 |
| EP | 1115263 A1 * | 7/2001 |
| JP | 2002-149405 | 5/2002 |
| WO | 02/23866 | 3/2002 |

OTHER PUBLICATIONS

Pozefsky et al., "A Meta-Implementation for Systems Network Architecture"; IEEE, 1982, 8pgs.*

* cited by examiner

*Primary Examiner*—Wei Y Zhen
*Assistant Examiner*—Ryan D. Coyer
(74) *Attorney, Agent, or Firm*—Wenderoth, Lind & Ponack, L.L.P.

(57) ABSTRACT

An service association system including, an "association template" in which service association details are described is prepared in advance; an actual service adaptable to a template instructed by a user is extracted; a specific association operation description is generated by adapting the actual service instructed by the user to the template; and the service is operated in association. As the result, it becomes possible to construct a service association system in which different services can be automatically adapted to the template in addition to the service which simply adapted to the template.

16 Claims, 21 Drawing Sheets

FIG. 5A

SV01
```
Service Weather weatherServer1 (Area area);      ...SV01L01
Service Weather weatherServer2 (Area area);      ...SV01L02
Service News newsServer1 (Void);                 ...SV01L03
```

FIG. 5B

SV02
```
Service Void weatherDevice1 (Weather weather);   ...SV02L01
Service Void boolDevice1 (Bool bool);            ...SV02L02
```

FIG. 7

```
Template WeatherTeller1 (Area area) {     ...T01L01
  Weather weather;                         ...T01L02
  while (true) {                           ...T01L03
    weather = WeatherServer (area);        ...T01L04
    WeatherDevice (weather);               ...T01L05
    wait (5);                              ...T01L06
  }                                        ...T01L07
}                                          ...T01L08
```

```
Adapter BoolDevice rainyBool (WeatherDevice)  {      ...A01L01
  WeatherDevice (Weather weather) {                  ...A01L02
    switch (weather) {                               ...A01L03
      case 'rainy' :                                 ...A01L04
        BoolDevice (true);                           ...A01L05
        break;                                       ...A01L06
      case 'sunny' :                                 ...A01L07
      case 'cloudy' :                                ...A01L08
        BoolDevice (false);                          ...A01L09
        break;                                       ...A01L10
    }                                                ...A01L11
  }                                                  ...A01L12
}                                                    ...A01L13
```

```
weatherTeller1a (Area area) {        ... D01L01
    Weather weather;                  ... D01L02
    while (true) {                    ... D01L03
        weather = WeatherServer1 (area);  ... D01L04
        weatherDevice1 (weather);     ... D01L05
        wait (5);                     ... D01L06
    }                                 ... D01L07
}                                     ... D01L08
```
D01

FIG. 10

```
weatherTeller1b (Area area) {                    ...D02L01
    Weather weather;                             ...D02L02
    while (true) {                               ...D02L03
        weather = WeatherServer1 (area);         ...D02L04
                                                 ...D02L05
        switch (weather) {                       ...D02L06
            case 'rainy' :                       ...D02L07
                boolDevice1 (true);              ...D02L08
                break;                           ...D02L09
            case 'sunny' :                       ...D02L10
            case 'cloudy' :                      ...D02L11
                boolDevice1 (false);             ...D02L12
                break;                           ...D02L13
        }                                        ...D02L14
        wait (5);                                ...D02L15
                                                 ...D02L16
    }                                            ...D02L17
}                                                ...D02L18
```

D02

FIG. 13
Variation of Association Specification Screen
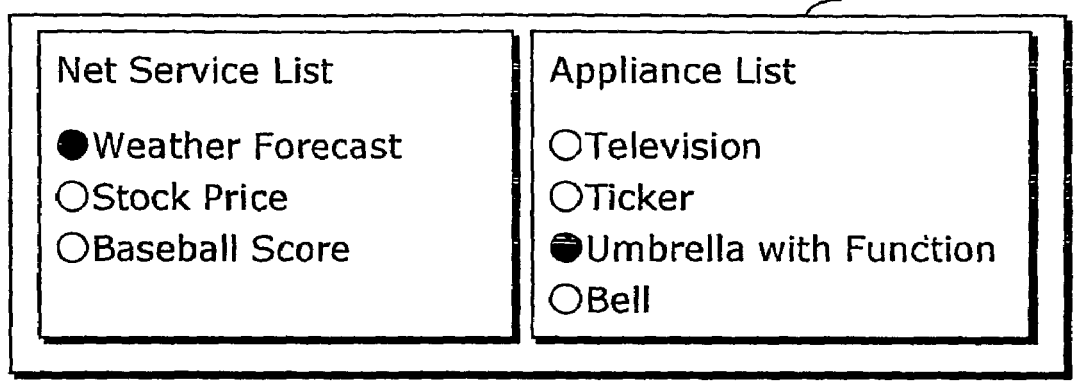
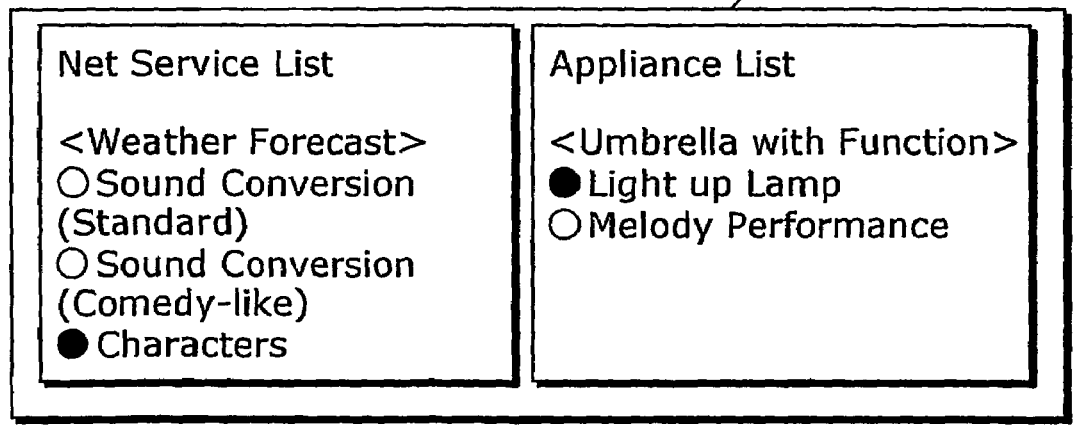

FIG. 19

```
Service Void HeadMountDisplay (Contents contents, Presence presence);  ...SV03L01
Service Motion MotionSensor (Void);                                     ...SV03L02
```

```
Adapter HeadMountDisplay WeatherHMD (WeatherDevice) {    ... A02L01
    WeatherDevice (Weather weather) {                    ... A02L02
        Motion motion = MotionSensor();                  ... A02L03
        switch (motion) {                                ... A02L04
            case 'moving' :                              ... A02L05
                HeadMountDisplay (weather, 30%);         ... A02L06
                break;                                   ... A02L07
            case 'still' :                               ... A02L08
                HeadMountDisplay (weather, 100%);        ... A02L09
                break;                                   ... A02L10
        }                                                ... A02L11
    }                                                    ... A02L12
}                                                        ... A02L13
```

```
weatherTeller1c (Area area) {                              ...D03L01
    Weather weather;                                        ...D03L02
    while (true) {                                          ...D03L03
        weather = WeatherServer1 (area);                    ...D03L04
        {                                                   ...D03L05
            Motion motion = MotionSensor();                 ...D03L06
            switch (motion) {                               ...D03L07
            case 'moving' :                                 ...D03L08
                HeadMountDisplay (weather, 30%);            ...D03L09
                break;                                      ...D03L10
            case 'still'  :                                 ...D03L11
                HeadMountDisplay (weather, 100%);           ...D03L12
                break;                                      ...D03L13
            }                                               ...D03L14
        }                                                   ...D03L15
        wait (5);                                           ...D03L16
    }                                                       ...D03L17
}                                                           ...D03L18
```
D03

ASSOCIATION CONTROL APPARATUS, ASSOCIATION CONTROL METHOD AND SERVICE ASSOCIATION SYSTEM

TECHNICAL FIELD

The present invention relates to a system for operating services in association with each other, the service being received through home appliances and various servers connected to a network.

BACKGROUND ART

In recent years, a system for providing various services by operating, in association with each other, a server and personal computer connected to a network such as the Internet, domestic home appliances and the like has been proposed.

Herein, it is necessary to customize (i.e. determination of details of the associated operation and definition thereof) the associated operation of the home appliances and server that are connected to the network. This requires a user efforts for grasping about all details of the associated operation and efforts for specifying the operation so that it becomes a large work loads for the user. On the other hand, a method for a user to select an associated operation from all pre-prepared associated operations is suggested. However, this method is not realistic since the number of combinations is enormous. Therefore, a method of automatically generating an association path in the associated operation according to an instruction of a user is proposed (e.g. refer to Japanese Laid-Open Patent publication No. 2002-149405).

However, in the conventional method, the system automatically generates the association path so that a range of generable associated operations is limited to a self generation capability of the system (i.e. a range of pre-prepared associated operations in the system). As the result, there is a case where it cannot satisfy user's needs.

Accordingly, concerning the conventional problem, the present invention aims to provide a service association system and the like which can provide associated operations in response to the user's needs.

DISCLOSURE OF INVENTION

In order to achieve the above objective, an association control apparatus according to the present invention is an association control apparatus which controls an association of operations of a first appliance and a second appliance that are connected to each other via a network, the operations being categorized in advance, the apparatus comprising: a template specification unit operable to specify, based on an instruction received from a user, an association template in which an outline of the association of the operations is described; an operation information search unit operable to search, based on description details in the specified association template, information relating to an operation of the first appliance and information relating to an operation of the second appliance; an operation description unit operable to describe specific operation details in the specified association template using the searched information; and an association execution unit operable to control the operation of the second appliance based on the association template in which the specific operation details are described.

Accordingly, a service applicable to the association template is extracted in the operation information search unit so that choices of the services applicable to the association template increase. Thus, it is possible to realize an association control apparatus which can customize associated operations whose range is not restricted by an ability of the system of automatically generating the association path.

Also, the association control apparatus further comprising an operation description conversion unit operable to convert, based on a conversion descriptor, a description indicating an operation of one category to a description indicating an operation of another category, wherein the operation description unit further describes the specific operation details using the description converted by the operation description conversion unit.

Accordingly, different types of services can be also adapted so that choices of services applicable to the association template increase. Therefore, it is possible to realize an association control apparatus which can customize associated operations whose range is not restricted by an ability of the system of automatically generating the association path.

The association control apparatus further comprises a descriptor storage unit operable to store the conversion descriptor, wherein the operation information search unit includes: a pre-extraction processing unit operable to specify a location in the association template at which the specific operation details are described; a descriptor search unit operable to search the descriptor storage unit for a conversion descriptor appropriate to the specific operation details whose description location is specified; and an operation search unit operable to search, using the searched conversion descriptor, for an operation appropriate to said conversion descriptor.

Further, in the association control apparatus, the operations of the first appliance and the second appliance are categorized depending on a service type indicating characteristics of the operations, the second appliance has an appliance identification (ID) for identifying said appliance and a service type appropriate to said appliance, the operation information search unit performs the search based on the service type, the operation description unit performs the description using the service type, and the association execution unit controls the operation of the second appliance using the service type and the appliance ID.

The association control apparatus further comprises: an operation information storing unit operable to store the information relating to the operation of the first appliance and the information relating to the operation of the second appliance, wherein the operation information search unit further includes a similar operation specification unit operable to specify, among the searched operations, a new operation similar to the searched operation based on the information stored in the operation information storage unit, and the association execution unit further controls the operation using the specified similar operation.

Further, in the association control apparatus, the service type includes: a data type indicating data inputted to the first appliance or the second appliance and outputted from the first appliance or the second appliance; a connection type indicating a form of connection between the first appliance and the second appliance; and a constraint type indicating a constraint according to the data input and output at the first appliance or the second appliance.

The association control apparatus also comprises an instruction receiving unit operable to receive specifications of the first appliance, the second appliance and the service type.

Furthermore, the association control apparatus comprises a schedule information obtainment unit operable to obtain information indicating an operation schedule of the first appliance via the network, wherein the operation description unit further describes specific operation details in the association template using the obtained information indicating the operation schedule.

Further in the association control apparatus, the operation information search unit searches for an operation appropriate to the association template using at least one of user's physical, mental and peripheral conditions.

Further in the association control apparatus, the operation description unit describes the specific operation details in the association template based on at least one of user's physical, mental and peripheral conditions.

Further in the association control apparatus, the operation description conversion unit performs the conversion based on a conversion descriptor which defines the plurality of operations.

Furthermore, in order to achieve the above objective, the service association system according to the present invention includes a first appliance, an association control apparatus and a second appliance that are connected to each other via at least one network, wherein the first appliance includes an information supply unit operable to supply information necessary for the association control apparatus according to a request from the association control apparatus, the association control apparatus controls' an association of operations of the first appliance and the second appliance, the operations being categorized in advance. A template specification unit is operable to specify, based on an instruction from a user, an association template in which an outline of the association of the operations is described. An operation information search unit operable to search for information relating to an operation of the first appliance and information relating to an operation of the second appliance based on description details of the specified association template; an operation description unit is operable to describe specific operation details in the association template using the searched information; and an association execution unit is operable to control the operation of the second appliance based on the association template in which the specific operation details are described.

Note that, in order to achieve the above objective, the present invention can be realized as an association control method using characteristic functional units of the association control apparatus as steps, and as a program including all steps of the method. The program can be not only stored in a ROM and the like included in the apparatus which can realize the method, but also distributed through a recording medium such as a CD-ROM and a transmission medium such as a communication network.

As described above, the service association system according to the present invention can be a service association system that can customize the associated operations whose range is not restricted by the ability of the system of automatically generating the association path.

Also, in the present invention, a service applicable to the association template can be extracted in the operation information search unit so that the choices of the services applicable to the association template increase. Therefore, the present invention can provide a service association system that can customize the association operation whose range is not restricted to the ability of the system of automatically generating the association path.

Further, the present invention can adapt not only limited to the service simply adapted to the association template but also different types of services automatically to the association template through a service adaptor. As the result, it can achieve both of controlling the number of association templates and increasing a range of choices of the associated operations.

Furthermore, the present invention can generate the associated operation relating to the appliance by registering a service type of the appliance. Consequently, the appliance can be operated in association with other service groups.

In addition, the present invention can generate the associated operation relating to the appliance by registering a service type such as a data type, a connection type and a constraint type. Consequently, the appliance can be operated in association with other service groups such as the data type, connection type and constraint type.

Also, when the user specifies an associated operation, the present invention can specify the associated operation by repeating to select a service and a service supply device from a list. Consequently, the service and appliance necessary for the associated operation can be correctly specified without specifying them at once.

Further, the present invention can instruct the associated operation relating to the service before the service starts. Consequently, it can be operated in association soon after the service starts.

Furthermore, in response to an introduction of a new service which has not managed, the present invention can generate an associated operation relating to the new service. Consequently, the appliance can be operated in association.

Also, in the present invention, the operation description unit can describe an associated operation relating to an appliance corresponding to an obtained appliance ID. Consequently, the association execution unit can operate the appliance in association.

Further, the present invention can specify the associated operations relating to the appliance A and the appliance B at once. Consequently, it can easily operate the plurality of appliances in association.

In addition, even in the case where an appliance does not have a unit which transmit an appliance ID and an instruction receiving unit, the present invention can specify the associated operation relating to the appliance. Consequently, it can easily operate the appliance in association.

Further information about technical background to this application, the disclosure of Japanese Patent Application No. 2003-390521 filed on Nov. 20, 2003 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 5 is a diagram showing an example of a service declaration held in the association template management unit.

FIG. 7 is a diagram showing an example of the association template in the first embodiment of the present invention.

FIG. 8 is a diagram showing an example of a service adaptor in the first embodiment of the present invention.

FIG. 9 is a diagram showing an example of a service association implemented in the first embodiment of the present invention.

FIG. 10 is a diagram showing other examples of the service association implemented in the first embodiment of the present invention.

FIG. 13 is a diagram showing an example of an association specification screen in an input/output unit of a service association system in a third embodiment according to the present invention.

FIG. 19 is a diagram showing a service example of a service association system in the seventh embodiment of the present invention.

FIG. 20 is a diagram showing an example of a service adaptor of the service association system in the seventh embodiment of the present invention.

FIG. 21 is a diagram showing a description example of a service association of the service association system in the seventh embodiment of the present invention.

BEST MODE FOR CARRYING OUT THE INVENTION

Hereafter, it is explained about embodiments according to the present invention with reference to the drawings.

FIRST EMBODIMENT

Figure 1:
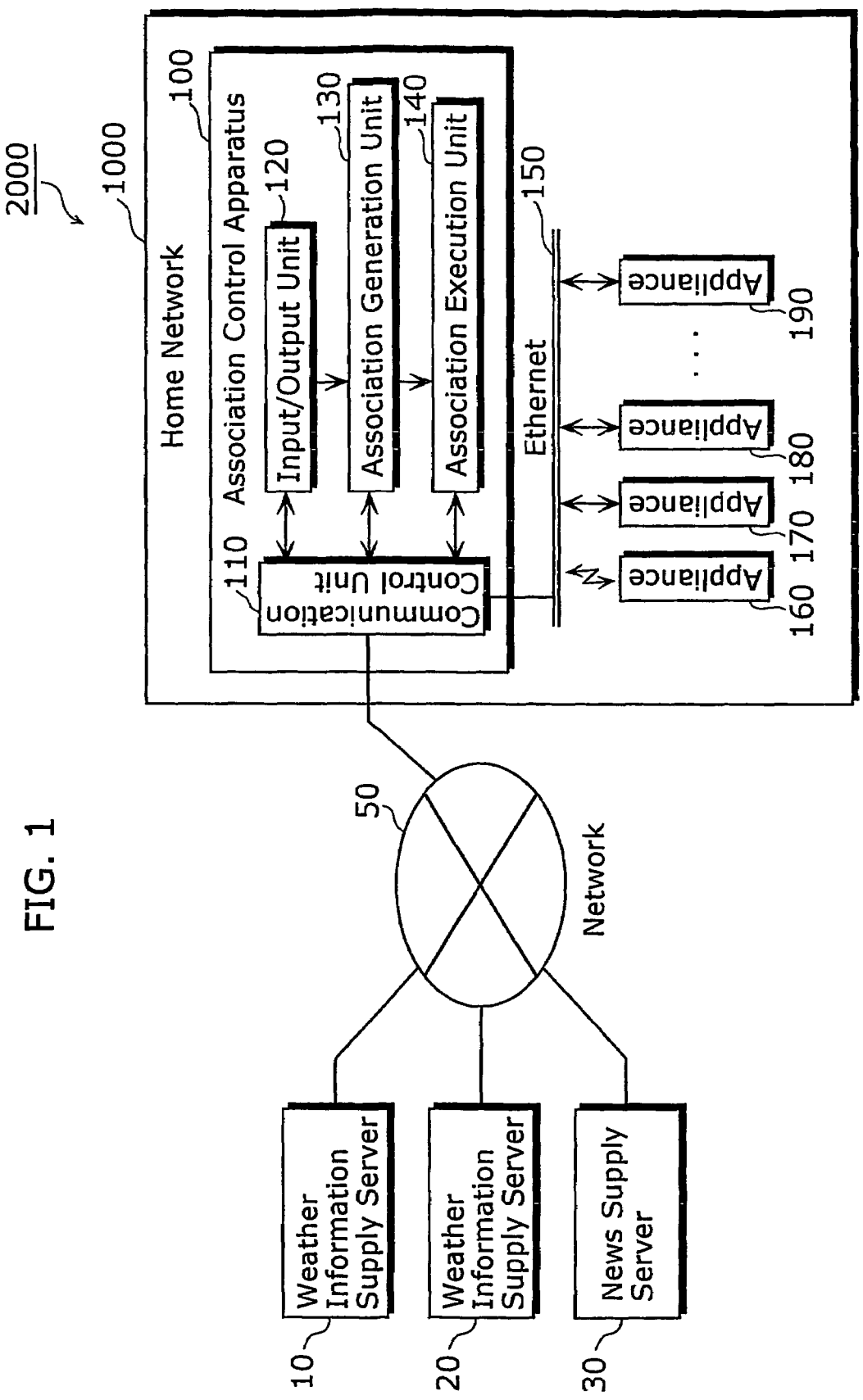
FIG. 1 is a diagram showing a configuration of a service association system in the first embodiment of the present invention.

FIG. 1 is a configuration diagram of a service association system 2000 in a present embodiment. As shown in FIG. 1, in the service association system 2000, a home network 1000 is connected to a weather information supply server 10, a weather information supply server 20, and a news supply server 30, and the system operates appliances 160 to 190 in the home network 1000 by associating with information obtained by each server. Note that server functions of the weather information supply server and the news supply server are examples of the information supply unit.

Here, a "service" in the present invention refers receiving a supply of information and the like from appliances connected to the network and providing information and the like to the appliances. Also, a "network connection" refers connecting to a local area network (LAN) and to the Internet. In this case, the connection form can be either by wire or by wireless. Further, an "appliance" in the present invention, for example, includes: a home appliance such as air conditioner and washer; an audiovisual appliance such as television, speaker and camera; an electric appliance which can input and output information such as electric bulb, switch, vibrator and various sensors; a compact appliance which can input and output information such as stuffed-toy shaped robot, function attached umbrella, and hanger with a liquid crystal display; an information communication appliance such as telephone and fax; an information processing appliance such as personal computer and home server; a portable appliance such as cellular phone and GPS terminal; a public appliance such as automatic door and traffic light; an information supply server such as weather information supply server, a traffic information supply server and ranking information supply server; a private server which deals with information relating to an individual and a group such as mailing server, scheduler server, television program recording server and family-keeping server; and function supply server which supplies functions such as dictionary server, language translation server, sound recognition server, image recognition server, format conversion server and authentication server. Further, "service association" in the present invention refers to provide a service by associating with the plurality of appliances by combining obtaining information from the appliances and the like, processing the obtained information and to providing the processed information to appliances and the like.

As shown in FIG. 1, the home network 1000 includes an association control apparatus 100 and appliances 160 to 190. Further, the association control apparatus 100 is, for example, a personal computer for controlling the home network 1000 as a whole. It includes a communication control unit 110, an input/output unit 120, an association generation unit 130, and an association execution unit 140.

The communication control unit 110 is, for example, a micro computer having a ROM which holds control programs, RAM and the like. While it controls the association control apparatus 100 as a whole, it controls communication with other servers through network 50 and a communication with other appliances 160 to 190 in the home network 1000 through an Ethernet 150.

The input/output unit 120 receives an instruction from a user and displays necessary information to the user. For example, it applies to one of or a combination of user interfaces such as a mouse and a liquid crystal panel. Note that the input unit is an example of the instruction receiving unit.

The association generation unit 130 generates an association template which specifies details of service to be operated in association.

The association execution unit 140, in order to execute the associated operation, transmits the association template generated by the association generation unit 130 to the communication control unit 110 and stores information relating to the associated operation. Note that the association execution unit is an example of the association execution unit.

Figure 2:
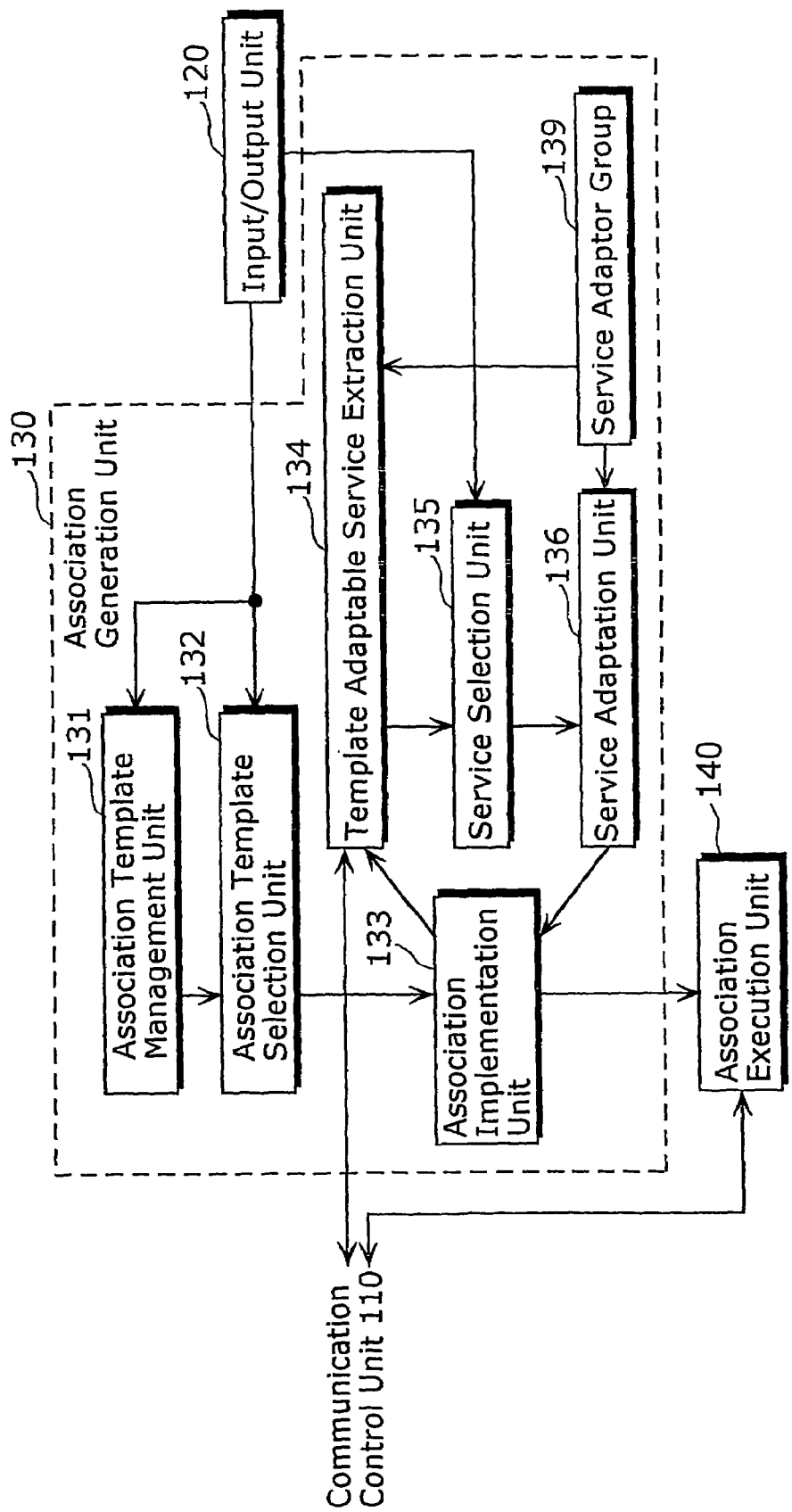
FIG. 2 is a block diagram showing a functional configuration of an association generation unit in the first embodiment of the present invention.

FIG. 2 is a block diagram showing a functional configuration of the association generation unit 130 shown in FIG. 1. As shown in FIG. 2, the association generation unit 130 has an association template management unit 131, an association template selection unit 132, an association implementation unit 133, a template adaptable service extraction unit 134, a service selection unit 135, a service adaptation unit 136, and a service adapter group 139.

The association template management unit 131 manages an association template in which details of the service association are described. Here, the "association template" is a file by which actual service can be defined later and in which an outline of details of an associated operation between services is previously described. Further, the association template management unit 131 holds a service declaration which is defined based on an instruction from a user. This "service declaration" is a declaration indicating details of a service defined in the association template. Note that the association template management unit is an example of the descriptor storage unit.

The association template selection unit 132 selects an association template in the association template management unit 131 based on the instruction received from the user via the input/output unit 120. Note that the association template selection unit is an example of the template specification unit.

The association implementation unit 133 defines actual service in the association template selected by the association template selection unit 132 and implements details of the service.

The template adaptable service extraction unit 134 extracts a service which is adaptable to the association template in the association implementation unit 133 via the communication control unit 110, that is, searches the service. Herein, the template adaptable service extraction unit 134 refers the service adaptor group 139 in accordance with the necessity. Note that the template adaptable service extraction unit is an example of the operation information search unit.

The service adaptor group 139 is a group of service adaptors (it also called as "conversion description") and has a function of managing those service adaptors. The service selection unit 135 selects the service extracted by the template adaptation service extraction unit 134 based on the instruction from the user received via the input/output unit 120.

The service adaptation unit 136 adapts the service selected by the service selection unit 135 to the association template in the association implementation unit 133. Herein, the service adaptation unit 136 uses a service adaptor in the service adaptor group 109 in accordance with the necessity. Note that the service adaptation unit is an example of the operation description conversion unit.

According to the above configuration, based on details defined in the association template, it becomes possible to increase choices of services adaptable to the association template by extracting the adaptable service from the template adaptable service extraction unit 134. Therefore, a service association system in which the range of associated operation is not limited by the association path automatic generation capability of the system and the associated operations can be customized is realized.

Figure 3:
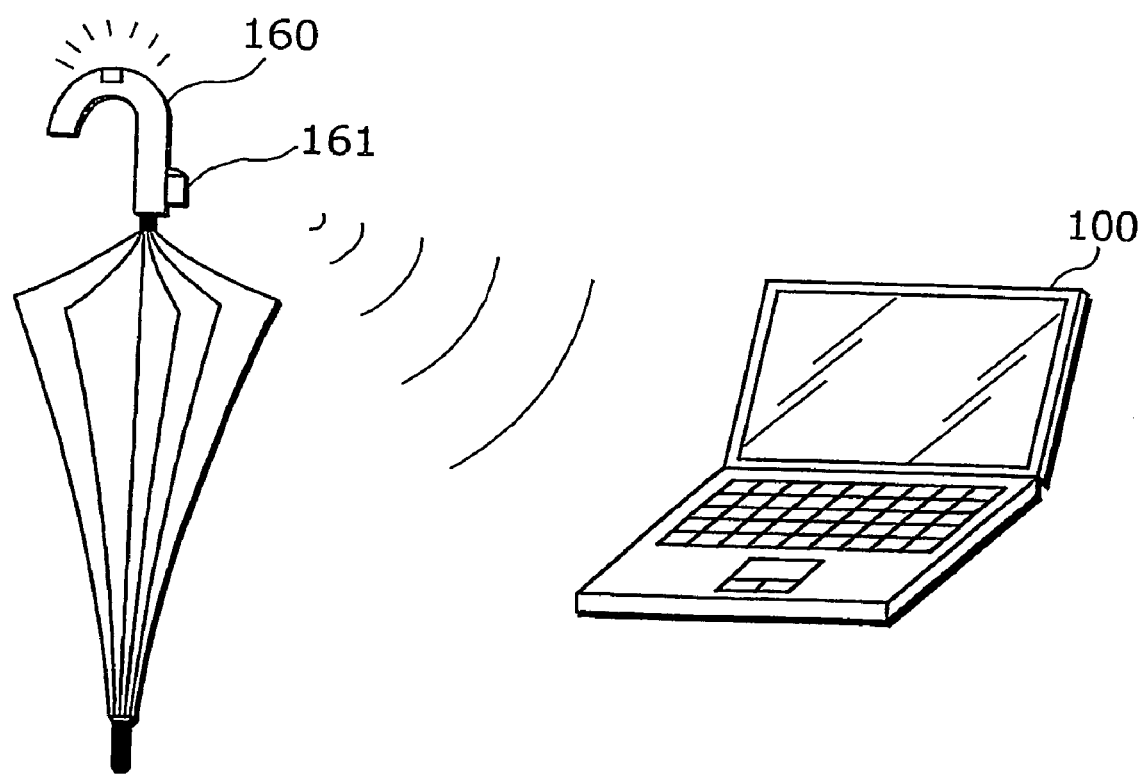
FIG. 3 is a diagram showing a specific example of appliances in a home network in FIG. 1.

FIG. 3 is a diagram showing a specific example of the appliance 160 shown in FIG. 1. As shown in FIG. 3, the appliance 160 is an umbrella with a function (more specifically, an umbrella with a lamp). When it receives weather forecast information about that it is going to rain from the weather information supply server, a LED installed in a handle lights up as the associated operation. Note that, the control unit 161 shown in FIG. 3 has a function of communicating with the communication control unit 110 through wireless LAN and the like and a function of controlling to light up the LED according to an instruction by the communication control unit 110.

FIG. 5 are diagrams showing examples of the service declaration held in the association template management unit 131.

Three service declarations are shown in a service declaration SV01 in FIG. 5A. As shown in FIG. 5A, it is indicated that the service defined in the declaration in the first line SV01L01 has a title "weatherServer1" and should input data of "Area type", and that it is a service which outputs data of "Weather type" and provides weather forecast information. Similarly, it is indicated that the service defined in the declaration in the second line SV01L02 has a title "weatherServer2" and should input data of the "Area type", and that it is a service which outputs data of the "Weather type" and provides weather forecast. Further, it is indicated that the service defined in the declaration in the third line SV01L03 has a title "newsServer 1" and does not need to input data, and that it is a service which outputs data in "News type" and provides news.

Also, it is indicated that the service defined in the declaration in the first line SV02L01 in FIG. 5B has a title "weatherDevice1" and should input data in "Weather type"; that it is a service without outputting data; and that it is operated by a home appliance having a display specific to weather forecast information (hereafter referred to as "weather display apparatus"). Furthermore, it is indicated that the service defined in the declaration in the second line SV02L02 indicates has a title "boolDevice1" and should input data of "bool type"; that it is a service without outing data; and that it is a service that operates a lamp which changes colors according to a data value (hereafter referred to as "lamp").

Figure 6A:
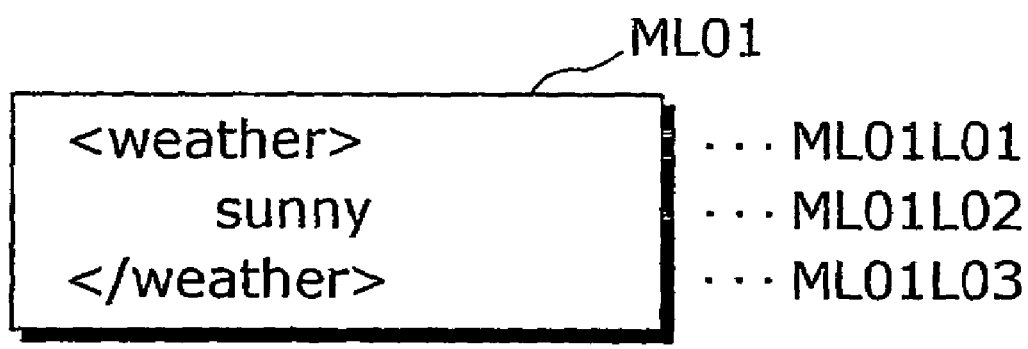
FIG. 6 is a diagram showing an example of data used in the association template.
Figure 6B:
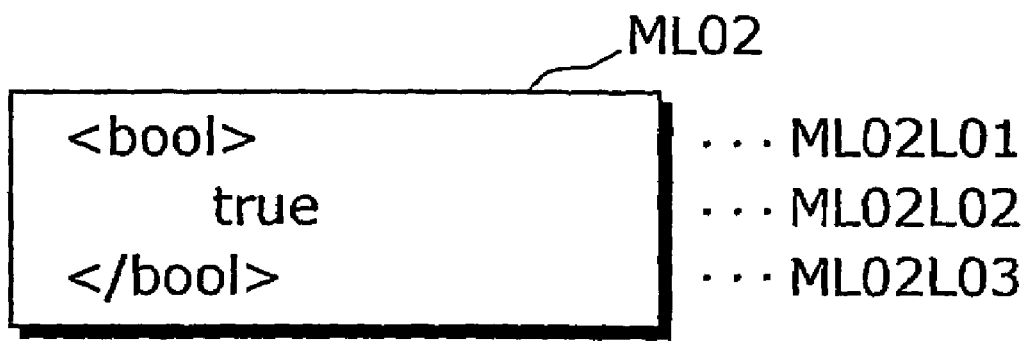

FIG. 6 is a diagram showing an example of data to be used in an association template. The data ML01 shown in FIG. 6A is an example of data of the "Weather type". The description in the second line ML01L02 "sunny" indicates that the weather is sunny. Here, the data of the "Weather type" can take values other than "sunny" such as "cloudy" indicating cloudy weather and "rainy" indicating rainy weather. The data ML02 shown in FIG. 6B is an example of data of the "Bool type". The second line of the description ML02L02 "true" indicates that the value is "true". Here, the data of the "Bool type" can take a value indicating "false" other than "true".

Next, it is explained about an operation of a service association system 2000 configured as described above.

Figure 4:
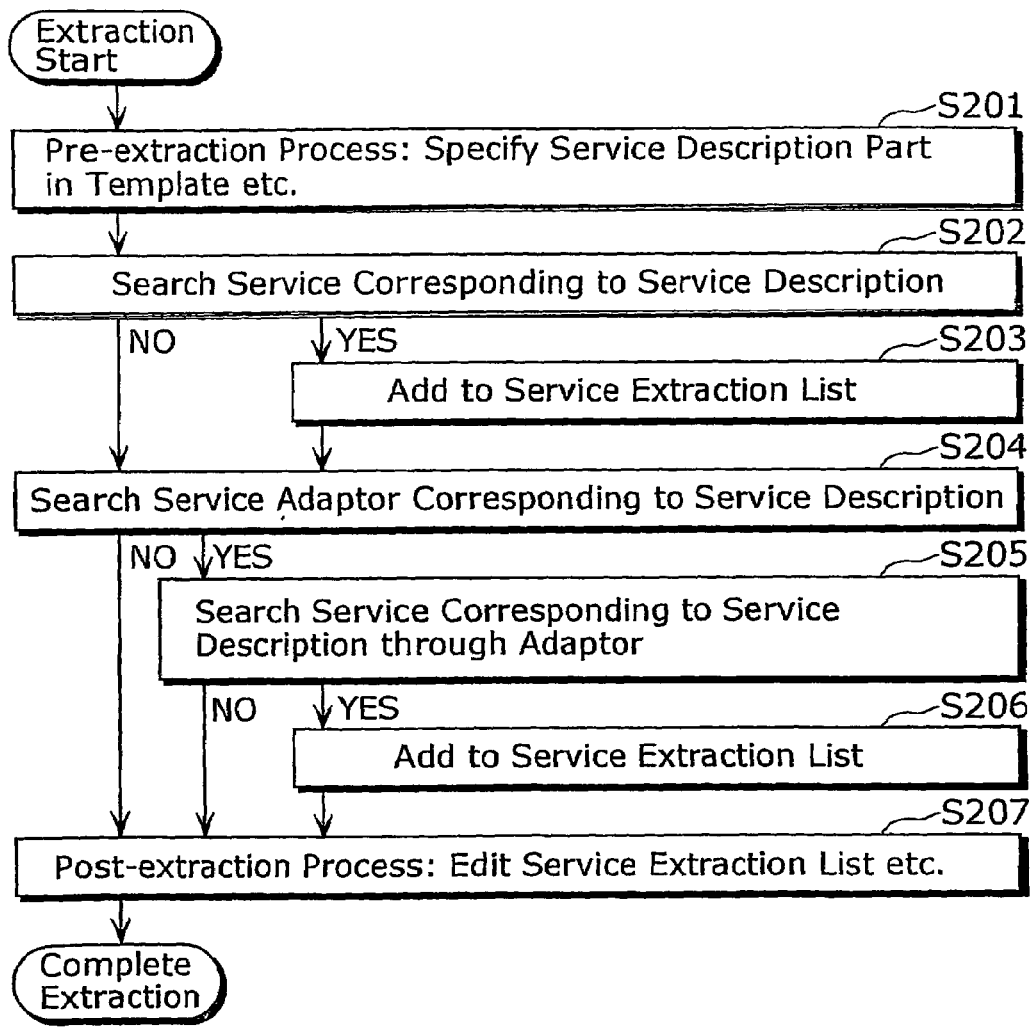
FIG. 4 is a flowchart showing a flow of operations of extracting a service appropriate to an association template in the first embodiment of the present invention.

FIG. 4 is a flowchart showing a flow of operations of extracting a service appropriate to the association template.

First, the template adaptable service extraction unit 134, as a process before the extraction, specifies a location in the association template where the service is described, and initializes a service extraction list (S201).

The process before the extraction is explained with reference to an example of an association template shown in FIG. 7. The association template T07 in FIG. 7 is a template for describing associated services of, for example, repeating in every determined time (e.g. every 5 minutes) to receive weather information from the weather information supply server 10 and transmit the received weather information to a weather display apparatus.

The description in the first line T01L01 in FIG. 7 indicates that the association template has a title "WeatherTeller1." and that area data of "Area type" to be transmitted to the weather information supply server 10 which receives the weather information can be set. The description in the second line T01L02 is a declaration for using data of the "Weather type". The description in the third line T01L03 indicates to repeat the processes until the following description in the seventh line T01L07. The description in the fourth line T01L04 indicates to obtain weather information of the "Weather type" from the weather information supply server 10 called "WeatherServer". The description in the fifth line T01L05 indicates to transmit the obtained weather information to the weather display apparatus called "WeatherDevice". The description in the sixth line T01L06 indicates to wait for 5 minutes. The description in the seventh line T01L07 indicates a breakpoint of the repeated details. Further, the description in the eighth line T01L08 indicates an end of definition of the association template.

Note that, "specification of a part in the association template where the service is described" in the process before the extraction (S201) indicates to specify that a service called "WeatherServer" is described in the description in the fourth line T01L04 of the association template in FIG. 7 and that a service called "WeatherDevice" is described in the description in the fifth line T01L05.

Next, the template adaptable service extraction unit 134 searches a service appropriate to the service description specified in the process before the extraction (S201) via the communication control unit 110 (S202). When the appropriate service is found, it is added to the initialized service extraction list (S203). On the other hand, when the appropriate service is not found, it searches a service adaptor appropriate to the specified service description from the service adaptor group 139 (S204). When the appropriate service adaptor is found, it moves on to the process S205 and when it is not found, it moves on to the process S207.

Here, with reference to FIG. 8, it is explained about a service adaptor. This "service adaptor" is, for example, a "conversion description" in order to deal the lamp as a weather display apparatus. The description in the first line A01L01 in FIG. 8 indicates the "BoolDevice" such as lamp as a start of the conversion description for indicating as the "WeatherDevice" such as weather display apparatus and indicates to describe the title of the service adaptor as "rainyBool". The description in the second line A01L02 indicates that the weather information of "Weather type" should be inputted as an interface of the "WeatherDevice". The description in the third line A01L3 indicates that the following processes are ramified according to the value of the weather information. From the description in the fourth line A01L04 to the description in the sixth line A01L06, it is indicated that, when the weather information says rainy, data of the "Bool type" which is "true" is transmitted to the "BoolDevice". From the description in the seventh line A01L07 to the description in the tenth line A01L10, it is indicated that, when the weather forecast says sunny or cloudy, data of the "Bool type" which is "false" is transmitted to the "BoolDevice". In the process of searching the service adaptor (S204), the "rainyBool" in FIG. 8 can be found as a service adaptor appropriate to the description in the fifth line T01L05 in FIG. 7.

As a service appropriate to the description in the fourth line T01L4 of "WeatherServer" of the association template in FIG. 7, the description in the first line SV01L01 in FIG. 5 "weatherServer1" and the description in the second line SV01L02 "weatherServer2" can be found. Also, as a service appropriate to the description in the fifth line T01L5 in FIG. 7 "WeatherDevice", the the description in the first line SV02L01 in FIG. 5B "weatherDevice1" can be found. In these examples, in order to judge whether the service description adapts to the service, a method of adapting the input/output data is used.

Next, a service appropriate to the specified service description is searched through the service adaptor found in the process S204 (S205). When the appropriate service is found, it moves on to the process S206 and when the appropriate service is not found, it moves on to the process S207.

The "boolDevice1" in FIG. 5B can be found as a service appropriate to the "WeatherDevice" in FIG. 7 through the "rainyBool" in FIG. 8.

Further, the service found in the process S205 is added to the initialized service extraction list (S206). In the case of the association template shown in FIG. 7, the "boolDevice1" in FIG. 5 is added.

In addition, the service extraction list including the service added in the processes S203 and S206 is edited and the result indicates the service extraction result (S207). In the case of the association template in FIG. 7, as a service appropriate to the "WeatherServer", the "weatherServer1" and "weatherServer2" in FIG. 5 are extracted, and as a service appropriate to the "WeatherDevice", the "weatherDevice1" and "boolDevice1" in FIG. 5 are extracted.

Through the above processes, the template adaptable service extraction unit 134 extracts a service. In the example of the association template in FIG. 7, an example of service association implemented in the service implementation unit 133 when the "weatherServer1" and the "weatherDevice1" are selected in the service selection unit 135 is shown in FIG. 9. The abstract service descriptions such as "WeatherSever" and "WeatherDevice" in the association template in FIG. 7 are implemented by the actual service of the "weatherServer1" and "weatherDevice1".

Also, FIG. 10 shows an example of the service association implemented in the association implementation unit 133 when the "weatherServer1" and "boolDevice1" are selected in the service selection unit 135. FIG. 10 indicates a state where the description is implemented so as to operate by associating the operation of the weather information supply server 10 with the appliance 160 (umbrella with function) using the service adaptor in FIG. 8.

As described above, in the present embodiment, it becomes possible not only to adapt only an appropriate service simply to the association template, but also to adapt different types of services automatically to the association template. Consequently, it can achieve both of controlling the association template and of increasing the range of choices of the associated operations.

Note that in the present embodiment, it is explained that the association template is a description of abstract associated operations between services. However, if the services are changeable, specific associated operations between services may be described in the association template.

Here, a management method used in the association template management unit 131 may be a method of managing only the registered association template or a method of searching on the network. Similarly, when the template adaptable service extraction unit 134 refers the service, it may refer in a range of the pre-registered service or it may refer by searching a service on the network.

Similarly, when the template adaptable service extraction unit 134 refers a service adaptor, it may refer in a range of the pre-registered service adaptor or it may search and refer the service adaptor on the network.

Note that the association template may be described in advance statically in an association generation program instead of being obtained dynamically from the association template management unit 131. Also, by combining the association templates, some of the association templates may be described in a program and others may be obtained dynamically from the outside.

Note that, the service adaptor may be searched automatically by the system, selected by a user or automatically generated by the system. Also, when selecting the service adaptor among a plurality of candidates, the service adaptor may be determined with reference to personal information, statistical information, service adaptor evaluation value, a degree of association of the service adaptor with the service, or a degree of association of the service adaptor with the association template. The number of choices may be reduced and the display order of the choices may be determined as well.

The present system may be a system which adapts an appropriate service to the association template without using the service adaptor. That is, it may be a system without the service adaptor group 139 shown in FIG. 2. Similarly, in the system, the processes from S204 to S206 in FIG. 4 are deleted so that the process S202 or S203 may directly moves on to the process S207.

Here, since there is no service adaptor, the choices of services which are adaptable to the association template can be narrowed. However, it is possible to implement the association template and operate the service in association unless there is a service appropriate to the associated operation. In that case, the number of association templates is increased so that more various associated operations can be implemented. While controlling the increase of the number of association templates, the service adaptor can implement the various associated operations.

The service adaptor may be described in advance statically in the association generation program instead of being obtained dynamically from the service adaptor group. In addition, as a combination of the service adaptors, some service adaptors may be described in the program and some may be obtained dynamically from the outside.

Here, an instruction according to an association template and a service via the input/output unit 120 may be performed by a system in place of a user. Herein, the system may refer to the personal information, statistical information, association template evaluation value, service evaluation value and the like.

Note that each unit shown in FIG. 1 is not necessarily set on one computer. For example, the association template management unit, the association implementation unit, and the association execution unit may be arranged on different computers on the network. The association execution unit may be included in the other appliances. That is, it may be included in a server or an appliance for the user.

Here, each unit shown in FIG. 3 may exist one or more. For example, the association execution unit 140 may exist as many as users.

SECOND EMBODIMENT

Figure 11:
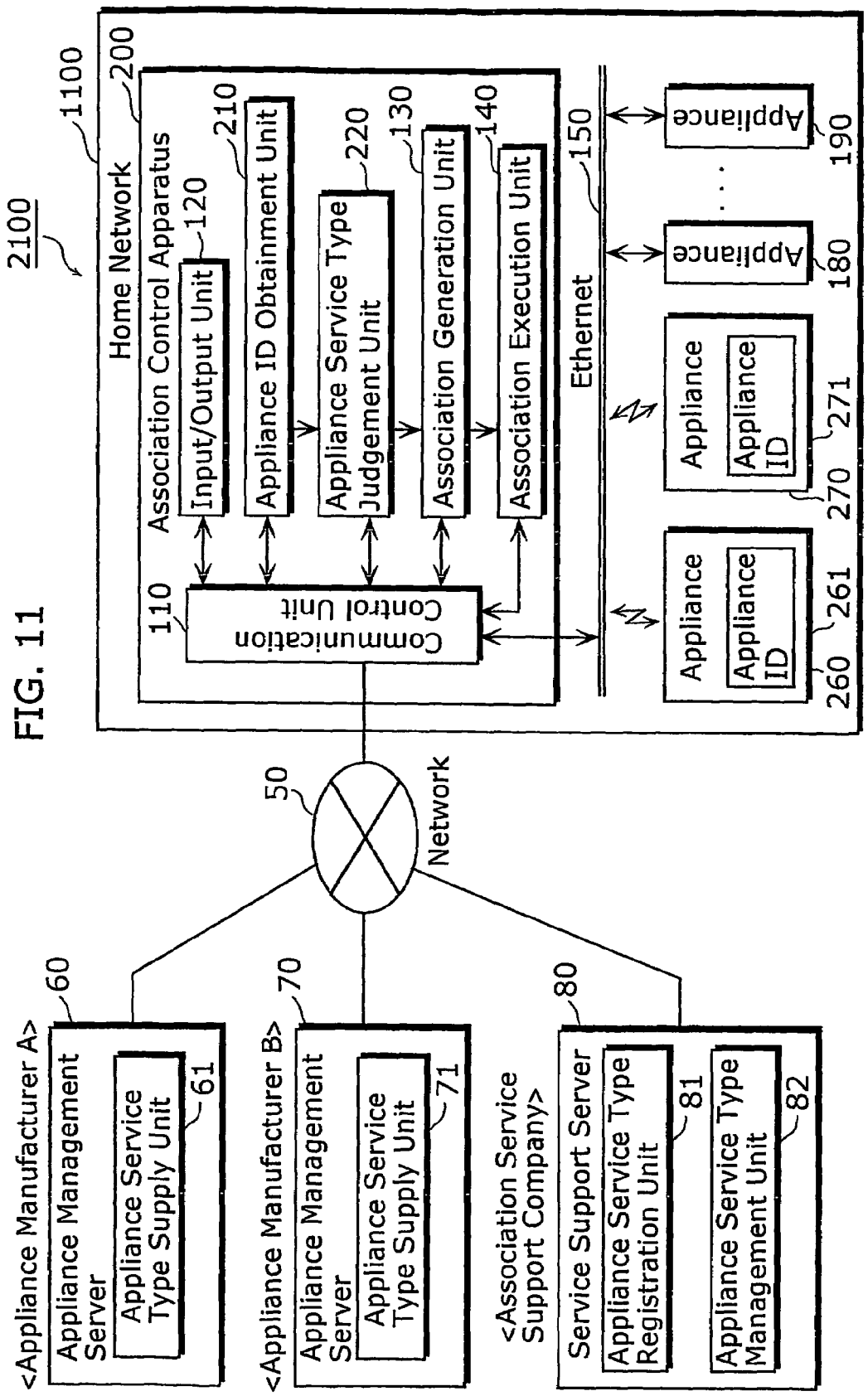
FIG. 11 is a diagram showing a configuration of a service association system in a second embodiment according to the present invention.

FIG. 11 is a diagram showing a configuration of a service association system 2100 in the second embodiment according to the present invention. As shown in FIG. 1, in the service association system 2100, an appliance management server 60 of an appliance manufacturer A, an appliance management server 70 of an appliance manufacturer B and a service support server 80 of an association service support company are respectively connected to a home network 1100 through a network 50.

The appliance management server 60 has an appliance service type supply unit 61 and manages information relating to a service type of a service provided using an appliance (e.g. umbrella with function) sold by the appliance manufacturer A.

The appliance management server 70 has an appliance service type supply unit 71 and manages information relating to a service type of a service provided using an appliance (e.g. umbrella with function) sold by the appliance manufacturer B.

The service support server 80 has an appliance service type registration unit 81 and an appliance service type management unit 82. The appliance service type registration unit 81 obtains and registers a service type in an appliance provided by each manufacturer from the appliance management server 60 or the appliance management server 70 through the network 50. The appliance service type management unit 82 manages the service type registered at the appliance service type registration unit 81.

The home network 1100 includes an association control apparatus 200, an appliance 260, an appliance 270, an appliance 180, and an appliance 190. Further, the association control apparatus 200 has a communication control unit 110, an input/output unit 120, an appliance ID obtainment unit 210, an appliance service type judgement unit 220, an association generation unit 130 and an association execution unit 140. Hereafter, same mark is assigned to the constituent in the present embodiment which has same function as the constituent in the first embodiment and the explanation about the same constituent is therefore omitted.

The appliance ID obtainment unit 210 obtains an appliance ID from the appliance 260 or the appliance 270. The appliance service type judgement unit 220 judges a service type of the appliance 260 or the appliance 270 using the appliance ID and service ID obtained by the appliance ID obtainment unit 210.

The appliance 260 or the appliance 270 holds respectively an appliance ID 261 or an appliance ID 271 which is associated with each service type.

Figure 12:
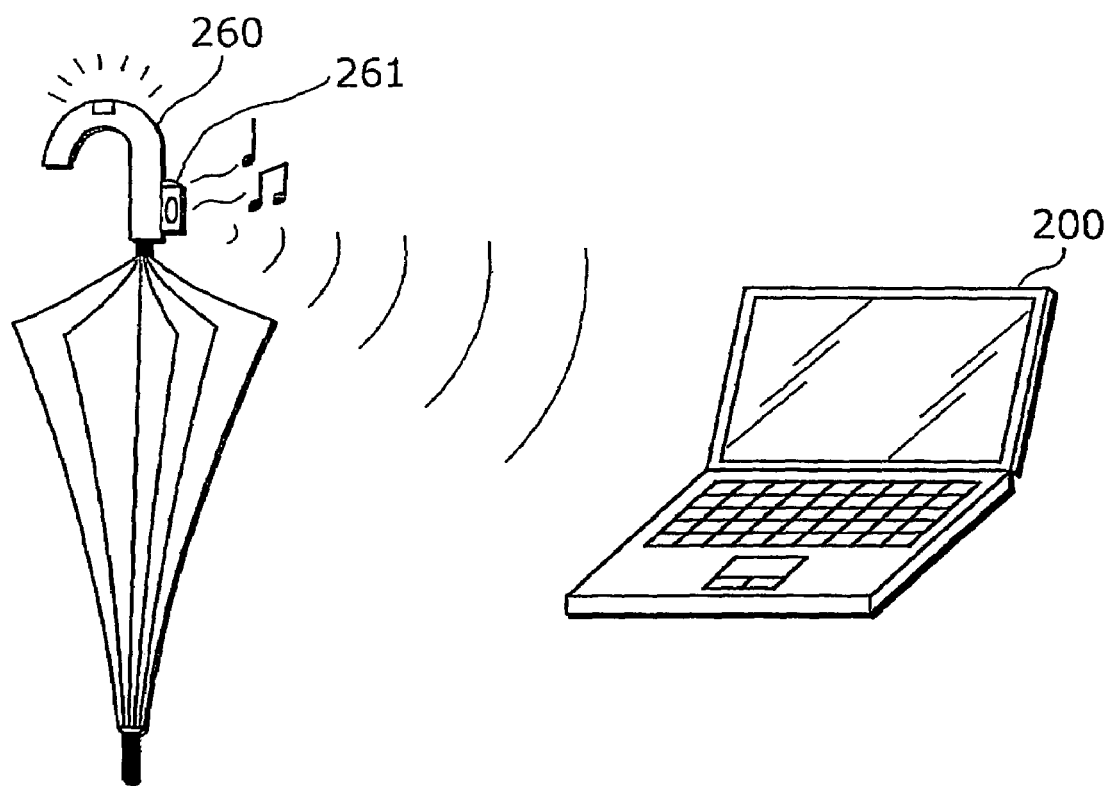
FIG. 12 is a diagram showing a specific example of appliances in FIG. 11.

FIG. 12 is a diagram showing a specific example of the appliance 260 in FIG. 11. As shown in FIG. 12, the appliance 260 is an umbrella with a function (more specifically, an umbrella with a lamp or a melody performance function). When the appliance 260 receives weather forecast information indicating that it is going to be "rainy" from the weather information supply server, a LED installed in a handle lights up or performs melody as the associated operation. Note that, the control unit 261 in FIG. 12 has a function of communicating with the communication control unit 110 by a wireless LAN and the like and of controlling the LED to light up or to play melody according to an instruction of the communication control unit 110.

According to the configuration in the present embodiment, an associated operation relating to an appliance is generated by registering a service type of the appliance. As the result, it becomes possible to operate the appliance in association with other service groups.

Here, the service type includes a data type indicating input/output data relating to the appliance 260 or the appliance 270, a connection type indicating a connection format of these appliances and a constraint type indicating a constraint according to an input/output of the data.

As examples of the data type, there are a weather type indicating data relating to weather shown in FIG. 6 of the first embodiment and a binary type indicating binary data. It also applies to a data type such as news type, stock type, and traffic information type indicating data on the Internet, a data type such as an air conditioner type and a washer type indicating a condition or conditional change of an appliance, a data type such as speaker type, bell type and robot control type causing a conditional change of an appliance, a data type such as camera type and GPS type indicating information from an information obtainment appliance, and a data type such as mail type and a schedule type indicating information relating to an individual and a group. Further, it includes data type which combines these data types.

As examples of the connection type, there are a connection type such as Hyper Text Transfer Protocol (HTTP) type, Simple Mail Transfer Protocol (SMTP) type, an Internet Relay Chat Protocol (IRC) type indicating a communication protocol; a connection type such as push type and pull type indicating a direction of information flow; a connection type such as request type, and broadcast type indicating a type of trigger which flows information; a connection type such as full-time connection type and on-again connection type indicating connection frequency; and a connection type such as secret communication type and open communication type indicating a level of information security in a connection path. Further, it includes a connection type which combines these connection types.

As examples of the constraint type, there are a constraint type which limits a value of the data type or a range of the value; a constraint type such as service time type which defines service time, service day type which defines days of week when the service is provided, service holiday type which defines days when the service is not provided indicating time and the like when the service is provided; a constraint type such as membership type and personal information type indicating an individual who can receive the service; a constraint type such as associated appliance type and associated service type which constrains a method of using data by indicating an appliance and a service that are permitted for an association target; a constraint type such as total amount type and payment type indicating payment information for charged services; and a constraint type such as maximum number of associated appliances type and maximum workloads type indicating a supply capability of a service supplier. Further, it includes a constraint type which combines theses constrain types.

In the above configuration, the associated operation relating to the appliance is generated by registering the service type such as data type, connection type and constraint type. As the result, the appliance can be operated in association with a service group of other data types, connection type, and constraint type.

Here, the service adaptor explained in the first embodiment is an example of a service adaptor which adapts the weather type of "Weather type" to the binary type of "Bool type". Using similar method, the service adaptor can adapt different data types to one another, different connection types to one another, and the different constraint types to one another. As an example of adapting different connection types, when the information obtainment request is requested in the HTTP protocol, in the case where there are an information supply server A of the connection type which can obtain the appropriate information and an information supply server B of the connection type which transmits information as a chat voice in the IRC protocol, a service adaptor can associate the information supply server A with the information supply server B as its connection type, the service adaptor executing an operation of repeating to transmit the information obtainment request to the information supply server A in every five minutes, transmits the obtained information as the chat voice, and to transmit a request to the information supply server A another five minutes later.

As an example of adapting different constrain types, in the case where there are an information supply server A holding a constraint on supplying information only in the morning and an information supply server B holding a constraint on supplying information only in the afternoon, a service adaptor which stores the data on the network can associate the information supply server A with the information supply server B as its constraint type.

Also, the service adaptor can adapt different types such as service type, data type, connection type and constraint type so that it can also adapt different types in an inheritance relationship. For example, in the case where there are, as a data type in the inheritance relationship, a "display data type" composed of character data and a "four characters display data type" composed of character data having four characters, the four character display data type inherits the character display data type since the four characters display type is one type of the display data type. Here, the service adaptor can be used for according the four characters display data type with the display data type. On the contrary, the service adaptor can also be used for adapting the display data type to the four character display data type.

Note that, as a method for the appliance to hold an appliance ID, any one of the following methods may be used: a method of storing the appliance ID in the storing unit of the appliance; a method of printing the appliance ID on the appliance; a method of attaching the printed matter of the appliance ID to the appliance; and a method of having the appliance to hold an IC chip and a tag which hold the appliance ID. Also, as a method of transmitting the appliance ID to an appliance ID obtainment unit, any one of the following methods may be used: a method of transmitting the appliance ID from the appliance to the appliance ID obtainment unit through a communication path; a method of notifying the appliance ID obtainment unit of the appliance ID by a user; and a method of transmitting the appliance ID to the appliance ID obtainment unit after obtaining the appliance ID from the appliance using an appliance such as scanner and a camera.

THIRD EMBODIMENT

FIG. 13 is a display example of an association specification screen of an input/output unit (not shown in the diagram) of a service association system in the third embodiment according to the present invention.

In FIG. 13, an association specification screen G101 is a screen on which a list of services (hereafter referred to as "service list") on the network 50 is displayed, indicating that there are services providing data of "weather forecast", "stock price", and "baseball score" on the screen. Also, as a list of appliances (hereafter referred to as "appliance list"), it displays a "television", a "ticker" having a display apparatus, an "umbrella with function" and a "bell". A black circle next to the weather forecast on the service list and a black circle next to the umbrella with function on the appliance list indicate that a user selects the weather forecast and the umbrella with function in response to the display.

Further, the association specification screen G102 shows, in the association specification screen G101 after a user selected the weather forecast and the umbrella with function, an example of a screen on which the display of services of stock price and baseball score are deleted from the service list, services of sound conversion and music conversion are displayed, and the displays of appliances other than a speaker are deleted from the appliance list. Here, by selecting, by a user from the service list, a service of sound conversions of a sound conversion (standard) or a sound conversion (comedy version), services and appliances necessary for outputting the weather forecast to a speaker are specified.

Figure 14:
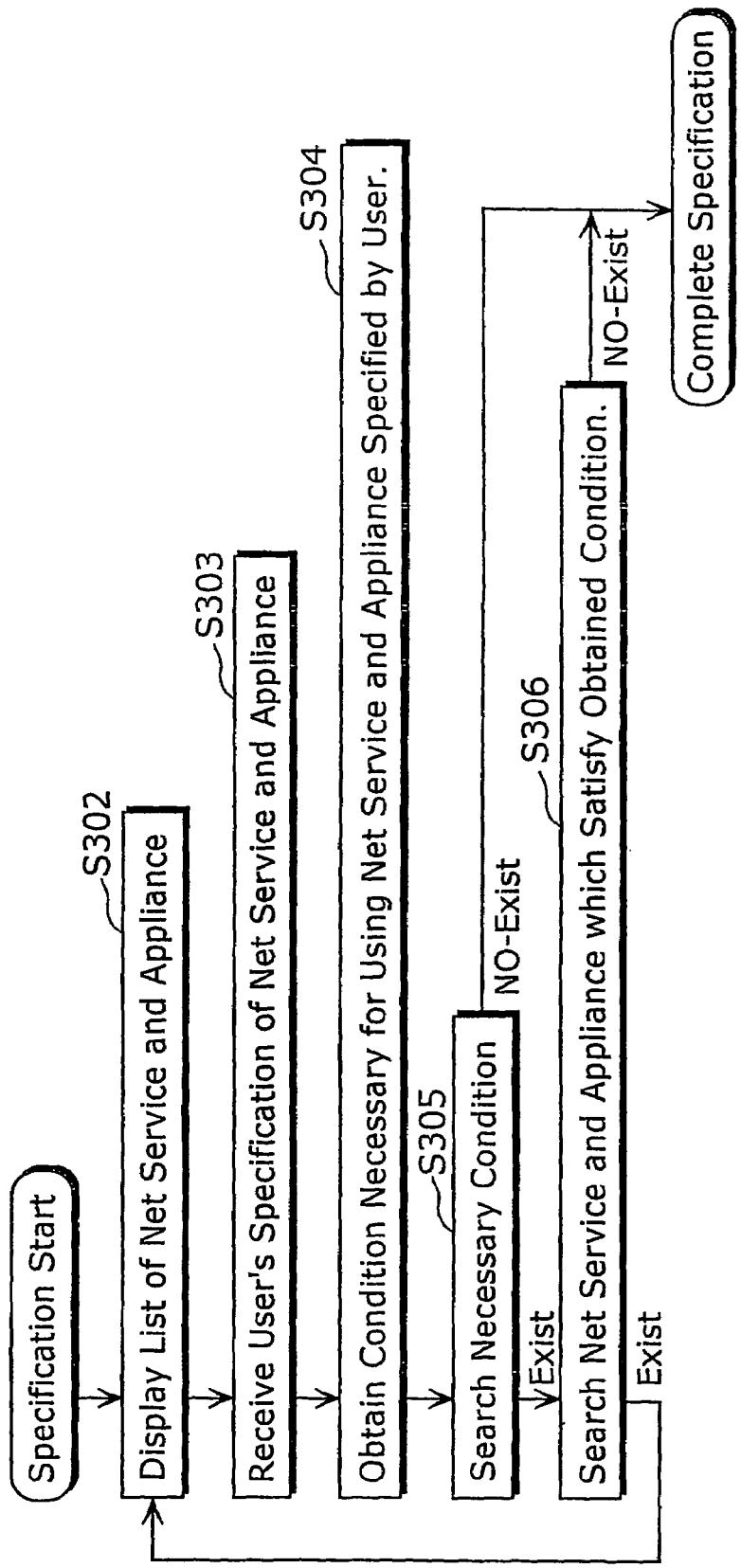
FIG. 14 is a flowchart showing a flow of operations in the input/output unit in the third embodiment according to the present invention.

Next, it is explained about an operation of the present system configured as described above. FIG. 14 is a flowchart showing a flow of operations in the input/output unit.

First, the input/output unit starts specifying a service on the network 50 and an appliance which provides the service (S301). It then displays a list of the service and the appliance (S302).

Furthermore, the input/output unit receives an instruction to the display in the process S302 from a user (S303). In the example of FIG. 13, it receives an instruction to specify a weather forecast and an umbrella with function.

Next, it obtains a condition necessary for using the service and the appliance specified in the process S303 (S304). In the example of FIG. 13, the weather forecast is displayed in characters and a lamp installed in the umbrella with function lights up.

After that, it searches for the condition obtained in the process S304 (S305). Further, when the condition is found in the process S305, it searches for a service or an appliance which satisfy the condition (S306). When the service and the like which satisfy the condition are found, it moves on to the process S302. In the example of FIG. 13, it searches for a service and an appliance by which the umbrella with function can convert the character data supplied from the weather forecast. As the result, services of a light-up conversion and a music performance conversion are found.

Furthermore, it completes the specification when the condition being searched in the process S304 and the service and appliance being searched in the process S305 are not found (S307).

Through the above operations, the present invention can specify the associated operation by repeating to select a service and an appliance which provides the service when the user specifies the associated operation. As the result, it can correctly specify the service and appliance necessary for the associated operation without instructing at once.

Note that, a service which can be specified, a service which satisfies a condition of the appliance, and the appliance may be searched in advance. As the result, it can avoid selecting a service and appliance that cannot satisfy the condition in the end.

FOURTH EMBODIMENT

Figure 15:
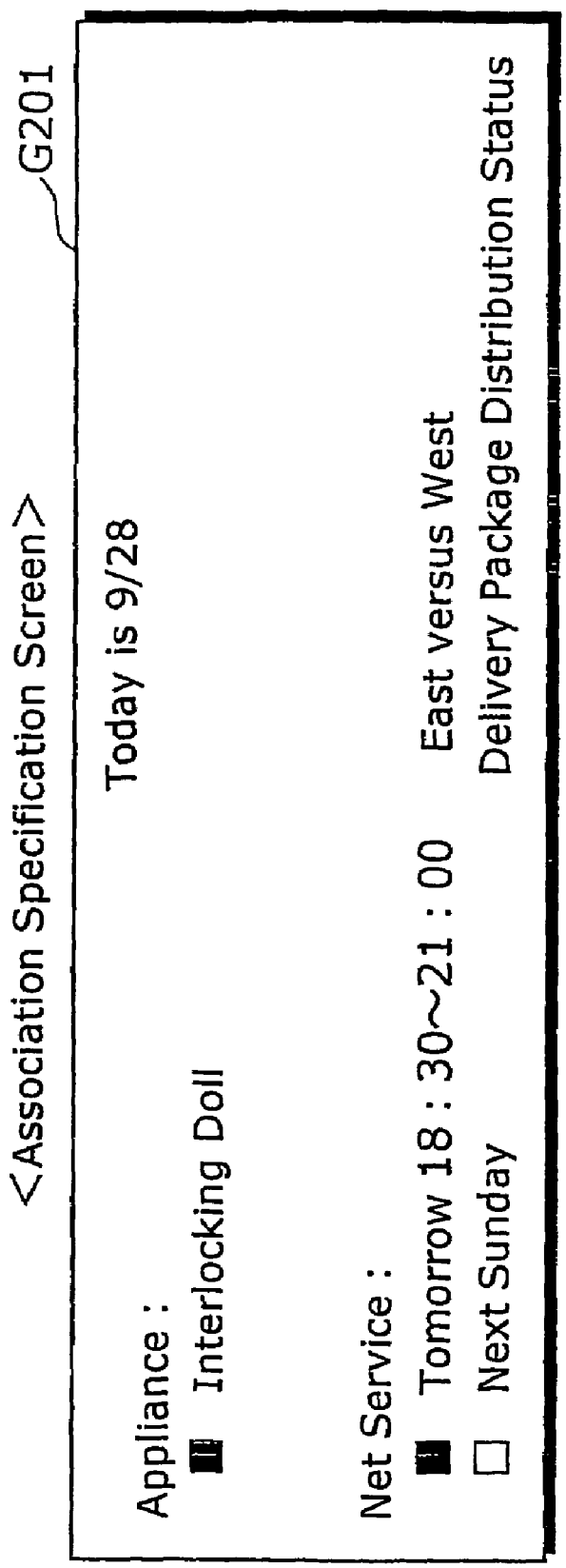
FIG. 15 is a diagram showing an example of an association specification screen in an input/output unit of the service association system in a fourth embodiment according to the present invention.

FIG. 15 is a diagram showing an example of an association specification screen in the input/output unit (not shown in the diagram) of a service association system in the fourth embodiment according to the present invention.

In FIG. 15, on an association specification screen G201, it is displayed, as an appliance, that there is an interlocking doll which changes a movement according to data of the service, and, as a service on the network 50, a professional baseball information supply service which supplies a process of professional baseball game of the East verses the West and the game result and a package delivery status service which provides a delivery status of a package to a user's home. A black mark displayed next to the interlocking doll indicates that the user has instructed to operate the interlocking doll in association. Displays of "tomorrow from 18:30 to 21:00" displayed left to the East versus the West and of "next Sunday" displayed left to the package delivery status indicate that those services have not yet started and that those services are started at the indicated time. The user selects services which have not yet been started so that the user can instruct to operate the service in association with the interlocking doll in accordance with the start of the service.

Figure 16:
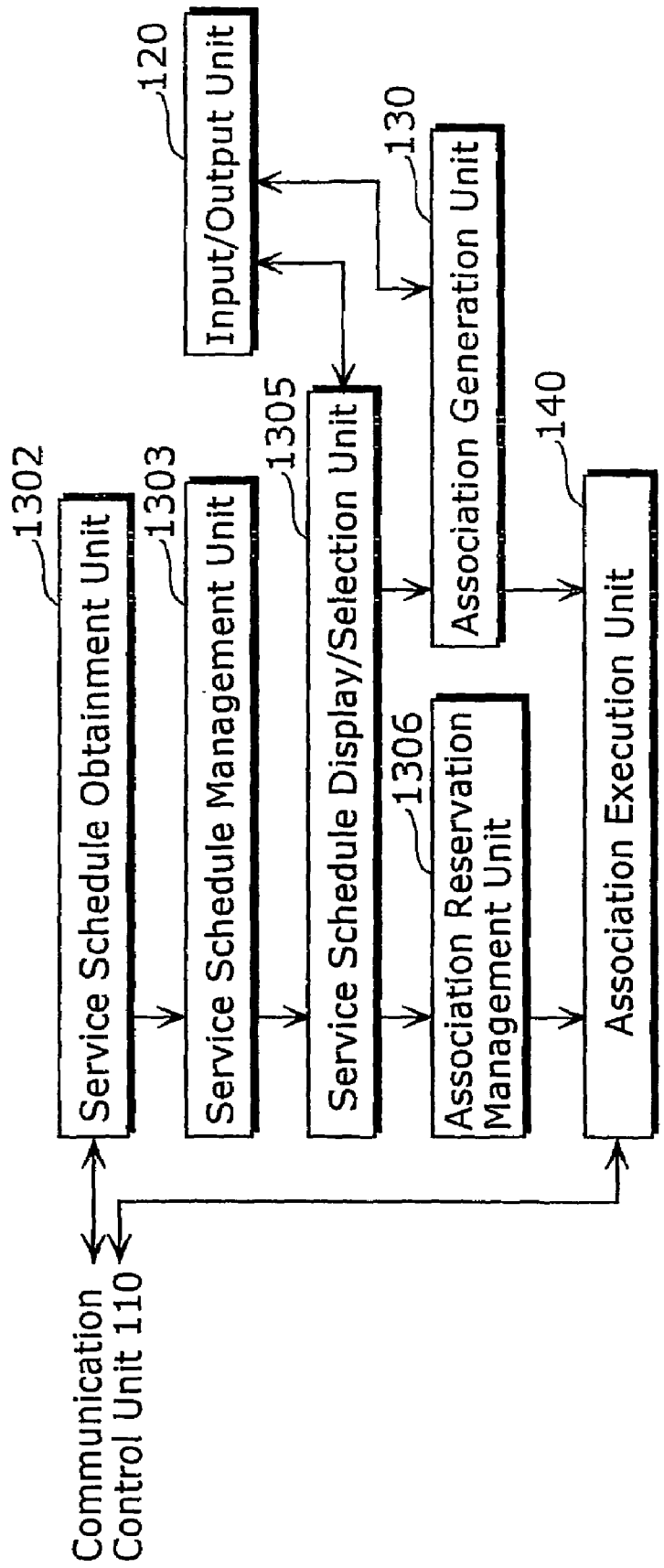
FIG. 16 is a block diagram showing a functional configuration of an association control apparatus in the fourth embodiment of the present invention.

FIG. 16 is a block diagram showing a functional configuration of an association control apparatus of the service association system in the fourth embodiment according to the present invention.

In FIG. 16, a service schedule obtainment unit 1302 obtains information indicating a service schedule from a service provider on the network 50 through a communication control unit 110. Note that, the service schedule obtainment unit is an example of the schedule information obtainment unit.

In the example of FIG. 15, it obtains information indicating a service schedule of "tomorrow from 18:30 to 21:00" from a service which provides a baseball score of the game of the East versus the West (hereafter referred to as "baseball score service"). Similarly, it also obtains information indicating a service schedule from the package delivery status service.

The service schedule management unit 1303 manages information indicating the service schedule obtained at the service schedule obtainment unit 1302.

A service schedule display/selection unit 1305 transmits information indicating a service schedule of the service schedule management unit 1303 to an input/output unit 1304 and receives an instruction from the user. In the example of FIG. 15, it displays the association specification screen G201 and receives selections of the interlocking doll as an appliance and a baseball score service as a service.

The association reservation management unit 1306 manages information relating to a service reservation selected by the service schedule display/selection unit 1305. In the example of FIG. 15, it manages information indicating time of 18:30 next day of the specified day as a start time of the associated operation.

The association generation unit 130 generates description for performing an associated operation relating to a service appropriate to the service reservation selected by the service schedule display/selection unit 1305. In the example of FIG. 15, it generates description for performing an associated operation in order to reflect data relating to the game obtained from the baseball score service with an operation of the association doll.

The association execution unit 140 operates, in association, service and the like in the service provider on the network 50 by the association reservation received from the association reservation management unit 1306 and the description for performing the associated operation received from the association generation unit 130. In the example of FIG. 15, the association execution unit 140, at 18:30 on the next day of the instructed day, obtains data relating to the game from the baseball score service, processes the data by the service adaptor if necessary, notifies the interlocking doll, and operates the interlocking doll.

In the above configuration, the associated peration relating to the service can be instructed before the service starts. As the result, the associated operation is performed soon after the service is started and the associated operation is terminated when the service is finished.

Here, the association execution unit may have started the associated operation before the start time of the service schedule unless the service and the information input/output are not before the start time. Similarly, the associated operation may be after the end time of the service schedule unless information input/output with the service is not performed later than the end time.

Note that, in the case where displaying the service schedule and where the associated operation is started/ended according to the service schedule, the displayed service schedule may be changed and the start time and end time of the associated operation may be changed with reference to user's schedule from a scheduler of the user, services other than the service, a schedule of an appliance and the like without using the determined service schedule time.

FIFTH EMBODIMENT

Figure 17:
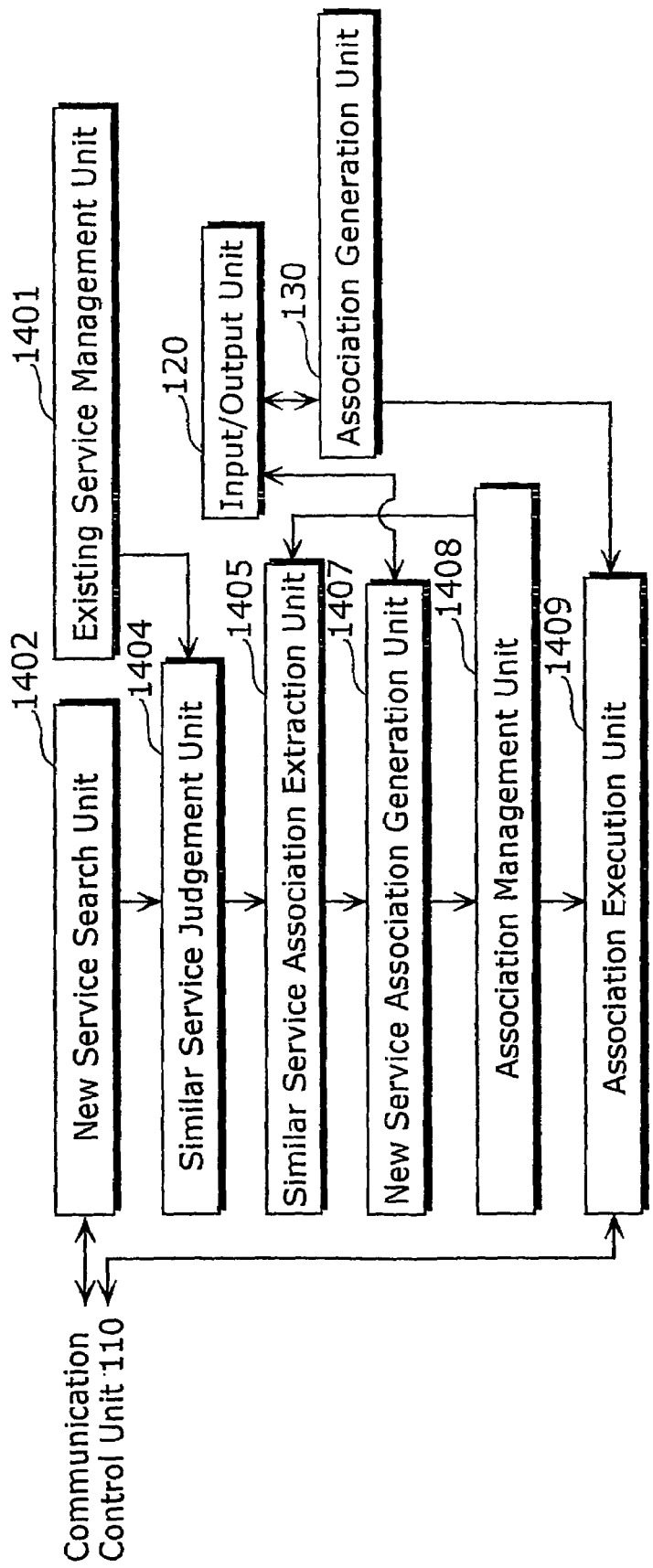
FIG. 17 is a block diagram showing a functional configuration of an association control apparatus in the fifth embodiment of the present invention.

FIG. 17 is a block diagram showing a functional configuration of an association control apparatus of a service association system in the fifth embodiment according to the present invention. In FIG. 17, an existing service management unit 1401 manages information relating to a service on the network 50 and a service (or an operation) of the appliance connected to the home network. Note that the existing service management unit is an example of the operation information storage unit.

A new service search unit 1402 searches for a new service which is not managed in the existing service management unit 1401.

A similar service judgement unit 1404 judges which service managed in the existing service management unit 1401 is similar to the new service searched in the new service search unit 1402.

An association management unit 1408 manages an associated operation description relating to a service and a service supply appliance.

A similar service association extraction unit 1405 extracts the associated operation description relating to the similar service judged by the similar service judgement unit 1404 from the association management unit 1408.

A new service association generation unit 1407 generates an associated operation description relating to the new service according to the associated operation description extracted by the similar service association extraction unit 1405 and an instruction from an input/output unit 1406 and sends it to the association management unit 1408.

An association execution unit 140 operates the new service in association by obtaining and executing the associated operation description relating to the new service from the association generation unit 130.

In the above configuration, according to an introduction of unmanaged new service, the associated operation relating to the new service can be generated. As the result, it is operated in association soon after the introduction of the new service.

Here, the similar service judgement unit 1404 may determine a judgement standard for similarity in order to accord a service type of each service.

Note that, in the case where a service type of the new service does not correspond to the service type of the similar service, the service types are adapted each other using a service adaptor and the associated operation description relating to the new service can be generated from the existing associated operation description.

SIXTH EMBODIMENT

Figure 18:
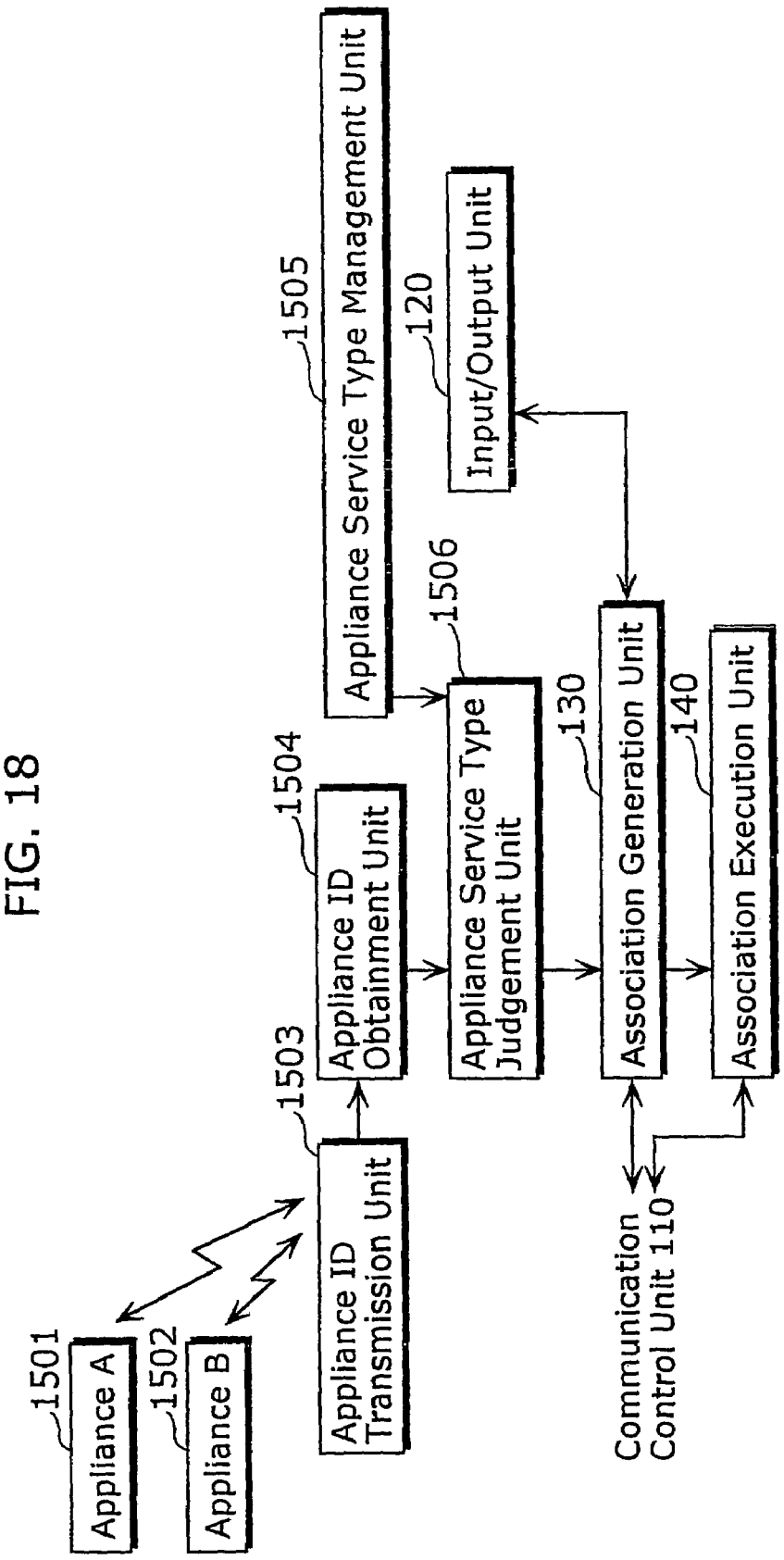
FIG. 18 is a block diagram showing a functional configuration of an association control apparatus in the sixth embodiment of the present invention.

FIG. 18 is a block diagram showing a functional configuration of an association control apparatus of a service association system in the sixth embodiment according to the present invention.

In FIG. 18, an appliance ID transmission unit 1503 obtains and transmits an appliance ID for specifying an appliance from an appliance A 1501 and an appliance B 1502.

An appliance ID obtainment unit 1504 obtains an appliance ID transmitted from the appliance ID transmission unit 1503.

An appliance service type management unit 1505 manages a service type of an appliance.

An appliance service type judgement unit 1506 judges a service type of an appliance appropriate to an appliance ID obtained by the appliance ID obtainment unit 1504 with reference to the appliance service type management unit 1505.

An association generation unit 130 generates a description for performing an associated operation suitable to the service type outputted from the appliance service type judgement unit 1506 based on an instruction from a user in the input/output unit 120.

An association execution unit 140 operates a service in association with an appliance based on the description for performing the associated operation generated in the association generation unit 130.

In the configuration described above, the association control apparatus can generate an associated operation relating to the appliance appropriate to the appliance ID obtained by the appliance ID obtainment unit. As the result, it can easily operate a plurality of appliances in association.

Also, the associated operation description to be generated includes an associated operation relating to the appliance A and the appliance B includes the appliance ID transmission unit and the input/output unit.

Further, in the configuration described above, the associated operation relating to the appliance A and the appliance B can be specified at once. As the result, the plurality of appliances are easily operated in association.

Also, the associated operation description to be generated includes the associated operation relating to the appliance A and the appliance B includes the appliance ID transmission unit and the input/output unit.

Furthermore, in the configuration described above, even when the appliance A does not include the appliance ID transmission unit and the input/output unit, an associated operation relating to the appliance A can be specified so as to easily operate the appliance A in association.

Note that, as a trigger for the appliance ID transmission unit to transmit the appliance ID, it may depends on a user instruction and a user recognition, on a state change of the appliance A and appliance B such as when the appliance starts connecting to the network, and other appliances are recognized, or on a change of physical relationship of the appliance A and the appliance B such as a closeness and attachment of a distance.

SEVENTH EMBODIMENT

Whereas a block diagram showing a functional configuration of a service association system in the seventh embodiment according to the present invention and an operation relating to a service extraction are basically same as those in the first embodiment, hereafter only the differences are explained.

FIG. 19 is a diagram showing a service example in a service association system (not shown in the diagram) in the seventh embodiment of the present invention. A description SV03 shown in FIG. 19 is an example of a declaration of two services. A service indicated in the description in the first line SV03L01 is a service by a head mount display (hereafter referred to as "HMD") which is a head mount type information display unit, indicating that its title is "HeadMountDisplay", data of "Contents type" is inputted and displayed, and that data of "Presence type" should be inputted. Here, the "Contents type" is a data type indicating information and content to be displayed to the HMD. The "Presence type" is a data type indicating to display HMD in how much degree of presence. The data of "Presence type" is described in a value indicating a degree such as 30% and 100%. The higher the value, the more screen size and volume are increased and the HMD displays information in a higher presence. On the other hand, the lower the value, the more screen size and volume are reduced and the HMD displays information in a lower presence. If the presence is higher, the user can view the information in immerse. If the presence is lower, the user can view information while doing something other than viewing the information. Also, a service shown in the description in the second line SV03L02 is a service by a sensor device which detects a motion of the user and outputs "Motion type" data. The "Motion type" is a data type indicating a type of the motion of the user. It indicates "moving" when the user is moving and "still" when the user is in still.

FIG. 20 is a diagram showing an example of a service adaptor in the present embodiment. The service adaptor in FIG. 20 is a conversion description which makes it possible to use the HMD as the weather display apparatus. The description in the first line A02L01 indicates a start of the description converting the HMD into a "Weather Device" such as the weather display apparatus and that the title of the service adaptor as "WeatherHMD". The description in the second line A03L02 indicates weather data of the "Weather type" as an interface of the "WeatherDevice". The description in the third line A03L03 indicates to obtain a type of a motion of a user from the sensor device. The description in the fourth line A03L04 indicates to divide later processes according to the obtained type of a motion of a user. It is indicated that, from the description in the fifth line A03L05 to the description in the seventh line A03L07, in a state where a user is moving such as walking, the weather is displayed to the HMD in a low presence. It is indicated that, from the description in the eighth line A03L08 to the description in the tenth line A03L10, in a state where a user is in still such as sitting, the weather is displayed to the HMD in a high presence.

Using the above service examples and the service examples explained in the first embodiment, an operation of extracting a service adapted to an association template is explained with reference to the flowchart shown in FIG. 4.

First, a process before an extraction is performed (S201). Using the association template of FIG. 7, the similar processes as in the first embodiments are performed.

Next, a service in accordance with the service description specified in the process S201 is searched on the network 50 (S202). When the appropriate service is found, the process moves on to the process S203. When the appropriate service is not found, the process moves on to the process S207. In the case of the association template in FIG. 7, as a service appropriate to the description in the fourth line T01L4 "WeatherServer", the description in the first line SV01L01 "weatherServer1" in FIG. 5 and the description in the second line SV01L02 "weatherServer2" can be found. Also, as a service appropriate to the description in the fourth line T01L05 "Weather Device", when the user is at home where the "weatherDevice1" is set, the description in the first line SV02L01 "weatherDevice1" in FIG. 5 can be found. When the user is not at home, the service appropriate to the "WeatherDevice" cannot be found.

Further, the service found in the process S202 is added to a service extraction list initialized in the process S201 (S203).

After that, a service adaptor appropriate to the service description specified in the process S201 is searched in the service adaptor group 109 (S204). When the appropriate service is found, the process moves on to the process S205. When the appropriate service is not found, the process moves on to the process S207. In the step of searching the service adaptor, in the case of the association template in FIG. 7, as a service adaptor appropriate to the description in the fifth line TL01L05 "WeatherDevice", the "rainyBool" in FIG. 8 and the "WeatherHMD" in FIG. 20 can be found.

Through the service adaptor found in the process S204, a service appropriate to the service description specified in the process S201 is searched from the service group 110 (S205). When the appropriate service is found, the process moves on to the process S206. When the appropriate service is not found, the process moves on to the process S207. Through the "rainyBool" in FIG. 6, as a service appropriate to the "WeatherDevice" in FIG. 5, when the user is at home, the "boolDevice1" in FIG. 3 is found. When the user mounts the HMD and is in outside, the HeadMountDisplay in FIG. 6 is found. Thus, according to place, time, device exists in periphery of the user, a service and device suitable to the user at that time are selected. An operation in the case where the "boolDevice1" is found is same as the operation explained in the first embodiment.

Next, hereafter explains about an operation in the case where the "HeadMountDisplay" is found.

The service found in the process S205 is added to the service extraction list initialized in the process S201 (S206). In the case of the association template in FIG. 7, the "HeadMountDisplay" in FIG. 19 is added.

Lastly, the service extraction list including services added at the process S203 and the process S206 is edited and the result becomes the service extraction result (S207).

In the case of the association template in FIG. 7, as a service appropriate to the "WeatherServer", the "weatherServer1" and the "weatherServer2" in FIG. 5 are extracted, and, as a service appropriate to the "WeatherDevice", the "HeadMountDisplay" in FIG. 19 is extracted.

Through the above operations, a service is extracted by the template adaptable service extraction unit 1034. As an example of the association template in FIG. 7, in the service selection unit 135, when the "weatherServer1" and the "HeadMountDisplay" are selected, an example of a service association implemented by the association implementation unit 133 is shown in FIG. 21. Abstract service descriptions such as the "WeatherServer" and the "WeatherDevice" in the association template in FIG. 7 are implemented by an actual service of the "weatherServer1" and the "HeadMountDisplay". By using the service adaptor in FIG. 20, the description is implemented to a description for operating the weather forecast server in association with the HMD. By executing the association description in FIG. 21, when the user is in outside mounting a permeable HMD and walking, the weather forecast is displayed in a lower presence with smaller screen size and volume. When the user is in outside and sitting, the weather forecast is displayed in a higher presence with larger screen size and volume. Thus, such service association is implemented.

Note that, in order to select a service and decide data to be inputted to the service, as shown in FIG. 20, a sensor which sensors a motion of a user and other information relating to the user may be used. The physical state of the user may be used by obtaining from a sensor such as GPS, acceleration sensor, thermometer, sphygmomanometer, camera, ammeter, and voltmeter. The mental state of the user may be used by obtaining or predicting from a camera, sphygmomanometer, blood flow meter, sight, electroencephalograph, expression, diaphorimeter, voice, gesture, stress-meter and the like. Also, the behavioral state of the user may be used by obtaining or predicting from a scheduler, objective list, traffic condition, weather forecast, peripheral goods, merchandize inventory, map, data collection of behavioral characteristics, behavioral records, and behavior of others.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The service association system according to the present invention includes an association implementation unit and an association execution unit and useful for a service association system, a service association method, a service association program and the like. In addition, it is applicable for an appliance connected to a network, a system for the appliance, service, program, content, medium and the like.

The invention claimed is:

1. An association control apparatus which controls an association of operations of a first appliance and a second appliance that are connected to each other via a network, the operations being categorized in advance, the apparatus comprising:
an association template management unit operable to store in advance a plurality of association templates each of which is a file in which an outline of the association of the operations is described and which includes a plurality of service descriptions in each of which an operation of a plurality of appliances that perform an association operation is described in an abstract form, and each of the plurality of service descriptions includes (1) a first service description that includes information specifying the first appliance that performs the association operation and information specifying the association operation performed by the first appliance, and (2) a second service description that includes information specifying the second appliance that performs the association operation and information specifying the association operation performed by the second appliance;
an input unit/output unit that receives instructions from and outputs information to a user; and
a control unit operatively connected with said input unit that controls operations of the association control apparatus, said control unit includes a memory storing one or more computer-readable programs that when executed by said control unit cause the association control apparatus to function as:
a template specification unit operable to specify, based on the instruction received from the user, one of the plurality of association templates stored in advance by said association template management unit;
an operation information search unit operable to search, based on description details in the specified association template, information relating to an operation of the first appliance and information relating to an operation of the second appliance;
an operation description unit operable to substantiate the plurality of service descriptions by describing specific operation details in the specified association template using the searched information; and
an association execution unit operable to control the operation of the second appliance based on the association template in which the specific operation details are described,
wherein the operation information search unit is operable to search the appliances connected via the network for the first appliance and the second appliance, each of which performs an operation indicated by corresponding one of the plurality of service descriptions included in the association template, and
the operation description unit is operable to substantiate the plurality of service descriptions by replacing the plurality of abstract service descriptions included in the association template with specific descriptions corresponding to one of the first appliances and the second appliance which have been searched by the operation information search unit.

2. The association control apparatus according to claim 1, further comprising:
an operation description conversion unit operable to convert, based on a conversion descriptor, a service description indicating an operation of one category to a service description indicating an operation of another category,
wherein said operation information search unit is operable to search for the first appliance and the second appliance in consideration of a conversion performed by said operation description conversion unit, and
the operation description unit is operable to replace the plurality of service descriptions included in the association template with the service descriptions corresponding to one of the first appliance and the second appliance which have been searched by the operation information search unit and which have been converted by the operation description conversion unit.

3. The association control apparatus according to claim 2, further comprising
a descriptor storage unit operable to store the conversion descriptor,
wherein the operation information search unit includes:
a pre-extraction processing unit operable to specify a location in the association template at which the specific operation details are described;
a descriptor search unit operable to search the descriptor storage unit for a conversion descriptor appropriate to the specific operation details whose description location is specified; and
an operation search unit operable to search, using the searched conversion descriptor, for an operation appropriate to said conversion descriptor.

4. The association control apparatus according to claim 1,
wherein the operations of the first appliance and the second appliance are categorized depending on a service type indicating characteristics of the operations,
the second appliance has an appliance identification (ID) for identifying said appliance and a service type appropriate to said appliance,
the operation information search unit performs the search based on the service type,
the operation description unit performs the description using the service type, and
the association execution unit controls the operation of the second appliance using the service type and the appliance ID.

5. The association control apparatus according to claim 4, further comprising
an operation information storing unit operable to store the information relating to the operation of the first appliance and the information relating to the operation of the second appliance,
wherein the operation information search unit further includes
a similar operation specification unit operable to specify, among the searched operations, a new operation similar to the searched operation based on the information stored in the operation information storage unit, and
the association execution unit further controls the operation using the specified similar operation.

6. The association control apparatus according to claim 4, wherein the service type includes:
a data type indicating data inputted to the first appliance or the second appliance and outputted from the first appliance or the second appliance;
a connection type indicating a form of connection between the first appliance and the second appliance; and a constraint type indicating a constraint according to the data input and output at the first appliance or the second appliance.

7. The association control apparatus according to claim 4, further comprising
an instruction receiving unit operable to receive specifications of the first appliance, the second appliance and the service type.

8. The association control apparatus according to claim 1, further comprising
a schedule information obtainment unit operable to obtain information indicating an operation schedule of the first appliance via the network,
wherein the operation description unit further describes specific operation details in the association template using the obtained information indicating the operation schedule.

9. The association control apparatus according to claim 1, wherein the operation information search unit searches for an operation appropriate to the association template using at least one of user's physical, mental and peripheral conditions.

10. The association control apparatus according to claim 1, wherein the operation description unit describes the specific operation details in the association template based on at least one of user's physical, mental and peripheral conditions.

11. The association control apparatus according to claim 1, wherein the operation description conversion unit performs the conversion based on a conversion descriptor which defines the plurality of operations.

12. A service association system, comprising:
a first appliance;
an association control apparatus; and
a second appliance, said first apparatus, said association control apparatus and said second apparatus being connected to each other via at least one network,
wherein said first appliance includes an information supply unit operable to supply information necessary for said association control apparatus according to a request from said association control apparatus, and said association control apparatus controls an association of operations of said first appliance and said second appliance, the operations being categorized in advance, and said association control apparatus includes
an association template management unit operable to store in advance a plurality of association templates each of which is a file in which an outline of the association of the operations is described and which includes a plurality of service descriptions in each of which an operation of a plurality of appliances that perform an association operation is described in an abstract form, and each of the plurality of service descriptions includes (1) a first service description that includes information specifying the first appliance that performs the association operation and information specifying the association operation performed by the first appliance, and (2) a second service description that includes information specifying the second appliance that performs the association operation and information specifying the association operation performed by the second appliance;
an input unit/output unit that receives instructions from and outputs information to a user; and
a control unit operatively connected with said input unit that controls operations of the association control apparatus, said control unit includes a memory storing one or more computer-readable programs that when executed by said control unit cause the association control apparatus to function as:
a template specification unit operable to specify, based on an instruction from a user, one of the plurality of association templates stored in advance by said association template management unit;
an operation information search unit operable to search for information relating to an operation of the first appliance and information relating to an operation of the second appliance based on description details of the specified association template;
an operation description unit operable to substantiate the plurality of service descriptions by describing specific operation details in the association template using the searched information; and
an association execution unit operable to control the operation of the second appliance based on the association template in which the specific operation details are described,
wherein the operation information search unit is operable to search the appliances connected via the network for the first appliance and the second appliance, each of which performs an operation indicated by corresponding one of the plurality of service descriptions included in the association template, and
the operation description unit is operable to substantiate the plurality of service descriptions by replacing the plurality of abstract service descriptions included in the association template with specific service descriptions corresponding to one of the first appliances and the second appliance which have been searched by the operation information search unit.

13. An association control method for controlling an association of operations of a first appliance and a second appliance that are connected to each other via a network, the operations being categorized in advance, the method comprising:
specifying, based on an instruction from a user, one of a plurality of association templates stored in advance each of which is a file in which an outline of the association of the operations is described and which includes a plurality of service descriptions in each of which an operation of a plurality of appliances that perform an association operation is described in an abstract form, and each of the plurality of service descriptions includes (1) a first service description that includes information specifying the first appliance that performs the association operation and information specifying the association operation performed by the first appliance, and (2) a second service description that includes information specifying the second appliance that performs the association operation and information specifying the association operation performed by the second appliance;
searching for information relating to an operation of first appliance and information relating to an operation of the second appliance based on description details described in the specified association template;
substantiating the plurality of service descriptions by describing specific operation details in the specified association template using the searched information; and
controlling the operation of the second appliance based on the association template in which the specific operation details are described,
wherein the appliances connected via the network for the first appliance and the second appliance are searched, each of which performs an operation indicated by corresponding one of the plurality of service descriptions included in the association template, and the plurality of service descriptions are substantiated by replacing the plurality of abstract service descriptions included in the association template with specific service descriptions corresponding to one of the first appliances and the second appliance which have been searched.

14. A program stored on a computer-readable storage medium and used for an association control apparatus which when executed by a computer controls an association of operations of a first appliance and a second appliance that are connected to each other via a network, the program causing the computer to execute the following steps:

specifying, based on an instruction from a user, one of a plurality of association templates stored in advance each of which is a file in which an outline of the association of the operations is described and which includes a plurality of service descriptions in each of which an operation of a plurality of appliances that perform an association operation is described in an abstract form, and each of the plurality of service descriptions includes (1) a first service description that includes information specifying the first appliance that performs the association operation and information specifying the association operation performed by the first appliance, and (2) a second service description that includes information specifying the second appliance that performs the association operation and information specifying the association operation performed by the second appliance;

searching for information relating to an operation of the first appliance and information relating to an operation of the second appliance based on description details of the specified association template;

substantiating the plurality of service descriptions by describing specific operation details in the specified association template using the searched information; and controlling the operation of the second appliance based on the association template in which the specific operation details are described, wherein the appliances connected via the network for the first appliance and the second appliance are searched, each of which performs an operation indicated by corresponding one of the plurality of service descriptions included in the association template, and the plurality of service descriptions are substantiated by replacing the plurality of abstract service descriptions included in the association template with specific service descriptions corresponding to one of the first appliances and the second appliance which have been searched.

15. An association control apparatus which controls an association of operations of a first appliance and a second appliance that are connected to each other via a network, the apparatus comprising:

an association template management unit operable to store in advance a plurality of association templates each of which is a file in which an outline of the association of the operations is described and which includes a plurality of service descriptions in each of which an operation of a plurality of appliances that perform an association operation is described in an abstract form, and each of the plurality of service descriptions includes (1) a first service description that includes information specifying the first appliance that performs the association operation and information specifying the association operation performed by the first appliance, and (2) a second service description that includes information specifying the second appliance that performs the association operation and information specifying the association operation performed by the second appliance;

an input unit/output unit that receives instructions from and outputs information to a user;

a control unit operatively connected with said input unit that controls operations of the association control apparatus, said control unit includes a memory storing one or more computer-readable programs that when executed by said control unit cause the association control apparatus to function as:

an association template generation unit operable to generate an association template which specifies the details of services to be operated in association with the first and second appliances;

an association template storing unit operable to store the association template generated by said association template generation unit, the association template including a plurality of service descriptions which specify operations of the first and second appliances that perform an association operation a template specification unit operable to specify, based on the instruction received from the user, one of the plurality of association templates stored in advance by said association template management unit;

an operation information search unit operable to search, based on description details in the specified association template, information relating to an operation of the first appliance and information relating to an operation of the second appliance;

an operation description unit operable to substantiate the plurality of service descriptions by describing specific operation details in the specified association template using the searched information; and an association execution unit operable to control the operation of the second appliance based on the association template in which the specific operation details are described, wherein the operation information search unit is operable to search the appliances connected via the network for the first appliance and the second appliance, each of which performs an operation indicated by corresponding one of service descriptions included in the association template, and the operation description unit is operable to substantiate the plurality of service descriptions by replacing the plurality of abstract service desciptions included in the association template with specific service descriptions corresponding to one of the first appliances and the second appliance which have been searched by the operation information search unit.

16. An association control method for controlling an association of operations of a first appliance and a second appliance that are connected to each other via a network, the method comprising:

generating a plurality of association templates which specifies the details of services to be operated in association with the first and second appliances;

storing the plurality of association templates generated, each association template being a file in which an outline of the association of the operations is described and which includes a plurality of service descriptions in each of which an operation of a plurality of appliances that perform an association operation is described in an abstract form, and each of the plurality of service descriptions includes (1) a first service description that includes information specifying the first appliance that performs the association operation and information specifying the association operation performed by the first appliance, and (2) a second service description that includes information specifying the second appliance that performs the association operation and information specifying the association operation performed by the second appliance;

specifying, based on an instruction received from a user, one of a plurality of association templates stored in advance;

searching, based on description details in the specified association template, information relating to an operation of the first appliance and information relating to an operation of the second appliance;

substantiating the plurality of service descriptions by describing specific operation details in the specified association template using the searched information; and controlling the operation of the second appliance based on the association template in which the specific operation details are described, wherein the first appliance and the second appliance are searched and each performs an operation indicated by corresponding service descriptions included in the association template, and the plurality of service descriptions are substantiated by replacing the plurality of abstract service descriptions included in the association template with specific service descriptions corresponding to one of the first appliances and the second appliance which have been searched.

* * * * *